United States Patent
Princiotta et al.

[19]

[11] Patent Number: 5,954,099
[45] Date of Patent: *Sep. 21, 1999

[54] NATURAL GAS DISTRIBUTION SYSTEM

[75] Inventors: Joseph Princiotta, Manalapan, N.J.; Alfred De Tomaso, East Meadow, N.Y.

[73] Assignee: Progas, Inc., Manalapan, N.J.

[ * ] Notice: This patent is subject to a terminal disclaimer.

[21] Appl. No.: 08/967,488

[22] Filed: Nov. 11, 1997

Related U.S. Application Data

[63] Continuation-in-part of application No. 08/465,814, Jun. 6, 1995, Pat. No. 5,709,252.

[51] Int. Cl.⁶ ....................................................... B65B 1/04
[52] U.S. Cl. ............................ 141/18; 141/98; 141/231; 141/236; 141/237; 410/47; 414/498
[58] Field of Search .................................. 141/18, 98, 197, 141/231, 232, 236, 237; 296/183, 181, 182; 410/47; 414/498; 222/608; 137/267, 899

[56] References Cited

U.S. PATENT DOCUMENTS

| | | |
|---|---|---|
| 493,896 | 3/1893 | Pierce . |
| 1,739,403 | 12/1929 | Lundberg . |
| 2,339,930 | 1/1944 | Howick . |
| 2,514,695 | 7/1950 | Dempsey .................................. 296/181 |
| 2,588,732 | 3/1952 | Kemp, Jr. . |
| 2,851,301 | 9/1958 | Jagsch . |
| 3,451,573 | 6/1969 | Josephian . |
| 3,602,368 | 8/1971 | Gould . |
| 3,752,529 | 8/1973 | Remke et al. . |
| 3,848,768 | 11/1974 | Griffin . |
| 3,993,344 | 11/1976 | Bennett . |
| 3,995,871 | 12/1976 | Vornberger et al. . |
| 4,022,343 | 5/1977 | Richardson . |
| 4,103,806 | 8/1978 | White . |
| 4,165,738 | 8/1979 | Graves et al. . |
| 4,294,374 | 10/1981 | Ames . |
| 4,295,431 | 10/1981 | Stalvo . |
| 4,391,377 | 7/1983 | Carlson . |
| 4,478,345 | 10/1984 | Edinger . |
| 4,481,972 | 11/1984 | Stavlo . |
| 4,542,774 | 9/1985 | Stavlo . |
| 4,600,033 | 7/1986 | Baron . |
| 4,605,126 | 8/1986 | Goedken et al. . |
| 4,633,767 | 1/1987 | Sain . |
| 4,659,132 | 4/1987 | Day . |
| 4,998,629 | 3/1991 | Cheng . |
| 5,004,117 | 4/1991 | Kitsuda . |
| 5,040,933 | 8/1991 | Lee et al. . |
| 5,058,758 | 10/1991 | Suddeth . |
| 5,253,682 | 10/1993 | Haskett et al. . |
| 5,273,337 | 12/1993 | Herrmeyer . |
| 5,385,263 | 1/1995 | Kirk et al. . |
| 5,782,521 | 7/1998 | Anderson .................................. 296/181 |

*Primary Examiner*—Henry J. Recla
*Assistant Examiner*—Timothy L. Maust
*Attorney, Agent, or Firm*—Darby & Darby

[57] ABSTRACT

A natural gas distribution system includes a gas cylinder having a first axial end and a second axial end. Protective collars are selectively connected to the cylinder ends. A valve is connected to the first axial end and is disposed within the first protective collar. The cylinder may be stored and transported in crates that have a plurality of compartments. Each of the plurality of compartments is configured to receive one gas cylinder in a substantially horizontal position. The crates in turn may be transported in delivery trucks that have bays with inclined floors and roll-down covering doors. An automatic air ventilation system makes sure that there is always air flow through the truck so there is no accumulation of any gas escaping from the cylinders in the truck. The truck may be equipped with refueling piping so that individual cylinders are refilled in the truck.

11 Claims, 22 Drawing Sheets

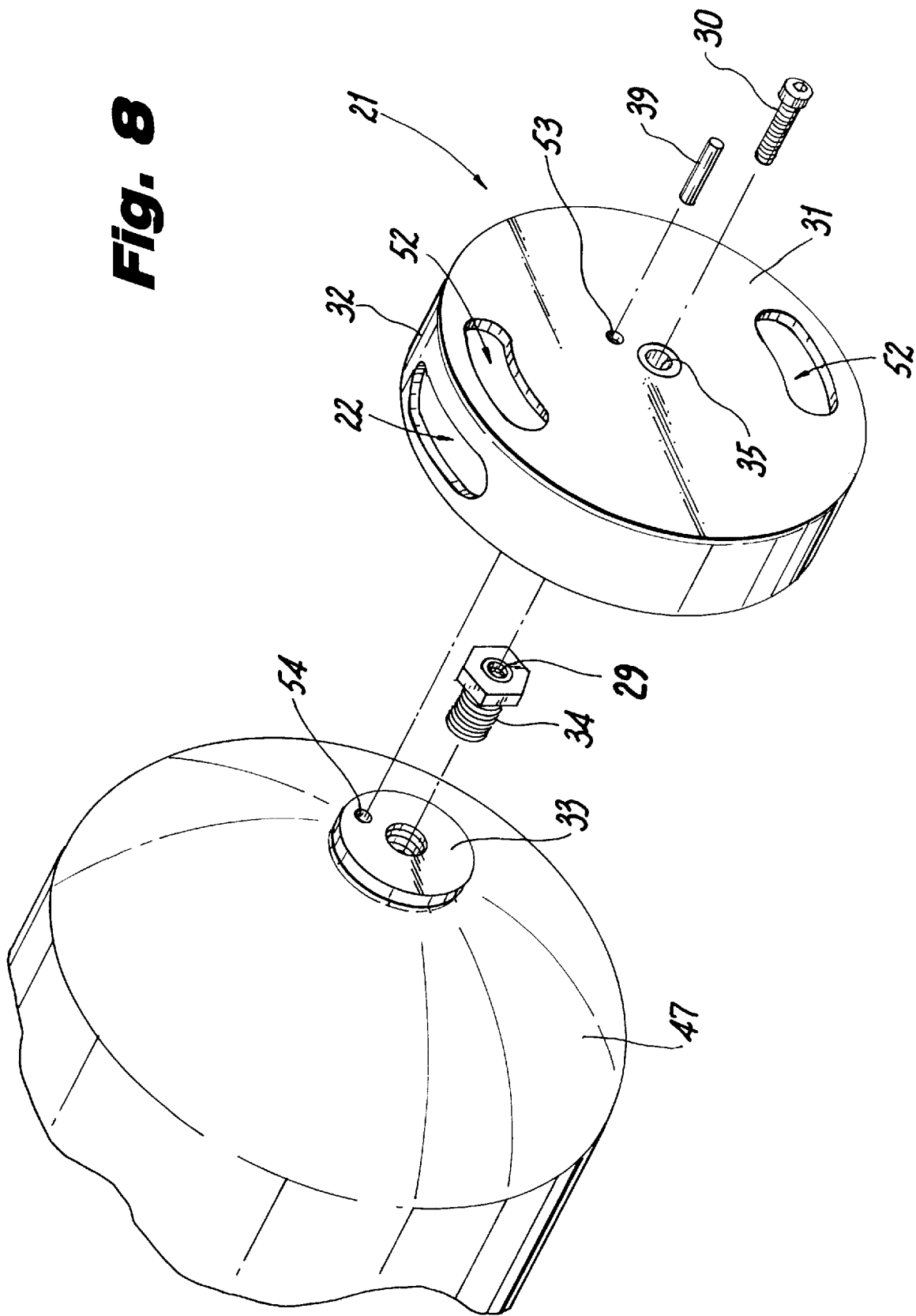

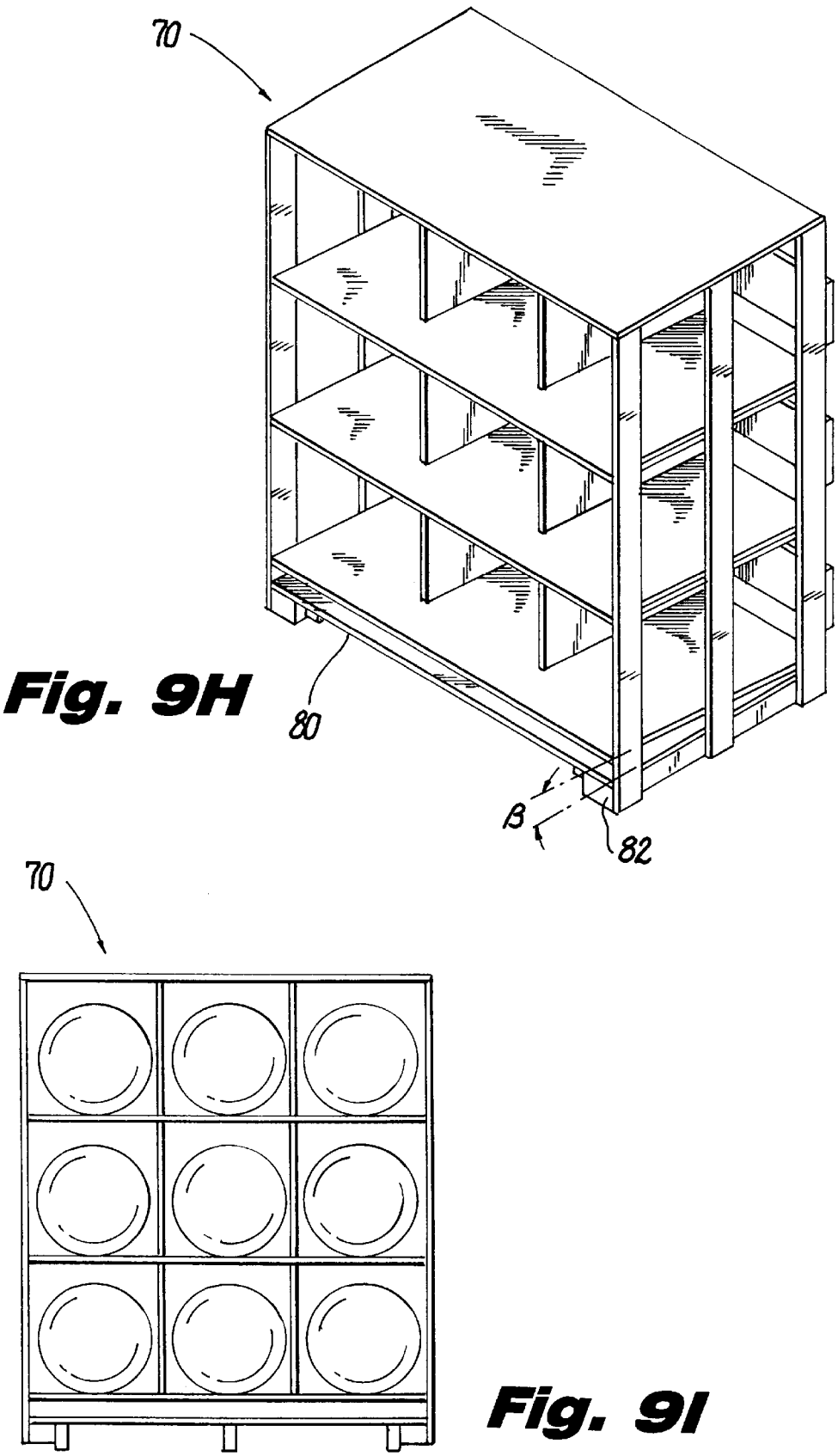

NATURAL GAS DISTRIBUTION SYSTEM

This is a continuation-in-part application of the U.S. Ser. No. 08/465,814 filed on Jun. 6, 1995, now U.S. Pat. No. 5,709,252.

BACKGROUND OF THE INVENTION

1. Field of the Invention

The present invention relates to a natural gas distribution system. More specifically, the present invention relates to a natural gas distribution system that includes a gas cylinder that includes a pair of collars disposed on each axial end of the gas cylinder, a delivery crate which has individual compartments for the storage of individual gas cylinders, a delivery truck which holds the crates and includes a ventilation system and a refueling truck which includes a ventilation system and a fuel pipeline system so that all of the empty cylinders disposed in the refueling truck can be simultaneously refilled.

2. Discussion of the Related Art

The utilization of natural gas as an alternative fuel source has become more popular in recent years. Accordingly, there has developed a need in the art to provide natural gas distribution system. For example, there is a need to provide a distribution system so that refilled natural gas cylinders can be delivered to the customer's site and empty gas cylinders can be removed from the customer's site. There is also a need in the art for a complete natural gas distribution system which includes modifying the gas cylinders so that they can be handled, stored and shipped without damaging the cylinder valve. Further, there is a need for a more efficient manner in which the gas cylinders can be stored, shipped and refilled.

Natural gas cylinders are generally safe. However, if the gas cylinder valve is damaged, the contents can rapidly vent, which can create an inflammable or explosive environment. In recognition of this danger, the Occupational Safety and Health Administration (OSHA) and the National Fire Protection Association (NFPA) have set up standards for compressed gas equipment which require that the cylinders be stored in well ventilated areas and protected from heat. Also, provisions must be made for protecting the valve from impacts, e.g., by stabilizing the cylinders against being tipped over. To accomplish this requirement, cylinders have been provided with protective collars. See for example U.S. Pat. No. 5,004,117 of Kitsuda. These prior art collars, however, tend to completely enclose the valve area and thus must be removed to permit ready access to the valve.

Since these cylinders must be moved about, it is also preferable to include a handle in the valve cover as shown in the Kitsuda patent. However, such handles at only one end of the cylinder make manipulation of the cylinder awkward.

Typically, gas cylinders are stored vertically in racks as shown, e.g., in U.S. Pat. Nos. 3,451,573 of Josephian; No. 3,602,368 of Gould; No. 3,993,344 of Bennett; Nos. 4,295,431 and 4,481,972 of Stavlo; and No. 4,605,126 of Goedken et al. This keeps the cylinders from tipping over, and thus helps to protect the valves. However, these racks do not provide very compact or accessible storage of the cylinders. As shown in these patents, the racks may be part of a gas delivery system where the racks are mounted in delivery trucks. Further, it is known in the art to refill the gas cylinders (when vertically mounted in the delivery truck as shown in U.S. Pat. No. 4,542,774 of Stavlo).

In addition to the valves of the cylinders, their bases are also vulnerable to physical damage. Also, it would be beneficial if the cylinders could be handled by both the valve and base ends. Further, more cylinders could be transported if the cylinders were positioned in a more compact manner than the vertical arrangement of the prior art, and if the cylinders could be refilled in this more compact arrangement. The present invention is directed to overcoming these and other problems with the prior art.

SUMMARY OF THE INVENTION

The present invention provides cylinder valve and base end collars which permit ready access to the cylinder valve and quick release couplings. These collars also provide built-in hand grips at both ends of the cylinder that make handling of the gas cylinder both easier and safer. The collar at the base of the cylinder permits the gas cylinder to be readily placed in a stable upright position, if necessary.

The collar of the present invention provides effective protection against impact on the cylinder valve and need not be removed for access to the valve. In particular the protective collar permits ready access to the cylinder valve for the flexible high pressure hose quick connect/disconnect couplings. This expedites the coupling/uncoupling process because the collar does not need to be removed for access to the valve.

It is acknowledged that there may be danger in the containment of high pressure gases within a cylinder. The weakest point of a gas cylinder is known to be the valve assembly and its associated components. Various safety features have been considered and are included in the design of the cylinder collar according to the present invention. The collar is so configured as to protect the cylinder valve should the cylinder be dropped, or should it inadvertently fall over, perhaps during handling or transport. Another safety feature incorporated into the collar design is a vent opening located below the pressure relief device of the cylinder valve. This opening will allow a safe exit route for the extremely rapid venting of the compressed gas stored in the cylinder in the unlikely event of damage to the cylinder valve. Yet another safety feature of the collar is the type of material to be used for its manufacture. The collar is preferably made of non-corrosive and rust free materials to prevent the possibility of metal fatigue or rust accumulation.

The collars according to the present invention are rugged and durable yet simple in design, and can be produced at low cost using simple manufacturing methods. The protective collar is easy to use, reliable, functional in operation and, because it is not permanently attached to the cylinder, it can be easily removed when necessary.

Because natural gas refilling stations are not readily available, the gas cylinders must be removed from the customer's site and replaced with filled gas cylinders delivered to the customer's site. Accordingly, the present inventors' have developed a system to store, deliver the gas cylinder to and from the customer's location and refuel the gas cylinder. The gas cylinders are to be shipped in specially designed crates, which may, for example, hold six or nine cylinders in a compact substantially horizontal position. The racks or crates actually hold the cylinders with about a 6° elevation of the valve end with respect to the base end. The crates are designed so they can be stacked, and interlocked when stacked. Thus, allowing for significant storage without using much floor space.

A cylinder delivery truck is designed for the transportation of compressed natural gas cylinders contained in the specifically configured delivery crates. The delivery truck is preferably divided into five rectangular bays of three different sizes arranged in two columns for a total of ten bays. The delivery racks or crates can be loaded with cylinders at the distributor's facility. The racks are constructed so that they can be lifted into or removed from the delivery truck bays by a conventional fork lift truck. While the delivery truck is in transit to a customer's site, additional delivery crates can be loaded at the distributor's facility so that they will be ready for delivery to the customer when the truck returns. This will allow the delivery truck to operate with greater efficiency and to complete more deliveries during the day. Full tanks will be removed from the crates by the customers as needed, and empty cylinders will be replaced in the crates. The use of a modular delivery crate will substantially reduce the time needed for loading and unloading cylinders from a truck bed as compared to rolling off each individual cylinder from the truck bed as would be required without the crate. Thus, employment of this modular concept reduces handling time.

Vehicles in use by presently known delivery systems often have a solid open flat bed which collects snow and ice in inclement weather, thus adding additional weight to the vehicle. Further, these cylinders are open to vandalism. The unique design of the delivery truck according to the present invention provides for the delivery of cylinders in an enclosed body having storage bays with individual locking, roll-down doors for each bay. Thus, the cylinder cannot break loose and are secure against vandalism. Also, no snow or ice can accumulate inside the truck. Another unique feature of this truck is the use of a ventilation system, which is an important safety feature. As the truck moves forward (and even when idle), air is forced through the vents in the upper front and rear portions of the truck body. This produces a constant and unrestricted flow of air through the truck body. When the truck is moving at a slow rate or is stationary, the flow of air through the delivery truck is continued by the use of conventional brushless exhaust fans operated by air flow sensors. When the vehicle engine is turned off, e.g., during refueling of the cylinders or overnight parking, an auxiliary power supply may be connected to the fans to make sure the ventilation continues. The delivery truck provides a transportation system in which the opportunity for damage to either the delivery crates or to the double vehicle bed during loading and unloading is minimized.

The truck design enables the fork lift operator to approach the truck bed with a delivery crate disposed at a 6° downward slope from the open end to the back side so that when the crate is loaded into the truck, the front end of the delivery crate is elevated; this ensures a safe and proper seating of the crate in the truck. The downward 6° slope of the delivery truck bed combined with the downward 6° slope of the cylinder crate shelves and the use of locking roll-down doors for each cylinder storage bay in the truck will ensure that the crates and cylinders stay in place, assuring safe delivery of the cylinders to a customer site.

In order to further increase the efficiency of gas delivery, gas cylinder refueling trucks or trailers can also be used. These vehicles are equipped with gas delivery conduits that extend from a gas connection at the rear of the truck to a plurality of gas outlets at the locations of various horizontally arranged gas cylinders stored in the truck. Typically, the gas inlet is at a convenient elevation at the rear of the truck so it can be easily reached by service personnel. From this location a main conduit extends to the top of the truck and then along the top of the truck toward its front. At each bay, lateral conduits branch from the main conduit on each side. These lateral conduits extend to the edges of the bays and then vertically downward to manifolds at the lower sections of the bay. Flexible conduits are tapped into these manifolds and have quick-disconnect couplings at their free ends so they can couple gas to individual gas cylinders which are stored horizontally in their racks or crates. This allows a distribution company to either have a storage tank for the gas at its facility or to send a refueling truck to a facility operated by a gas production company, thus reducing the capital expense involved in constructing a storage facility. Also, if a distribution company has more than one storage site, the refueling truck can allow the gas at one site to be shared with customers normally served by the other site.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein:

FIG. 8 is an exploded view of the cylinder, end plug and the end plug collar showing the assembly of the end plus the collar to the cylinder;

FIGS. 9A–9I are various views of different embodiments of the crates according to the present invention;

DETAILED DESCRIPTION OF THE PREFERRED EMBODIMENT

Figure 1:
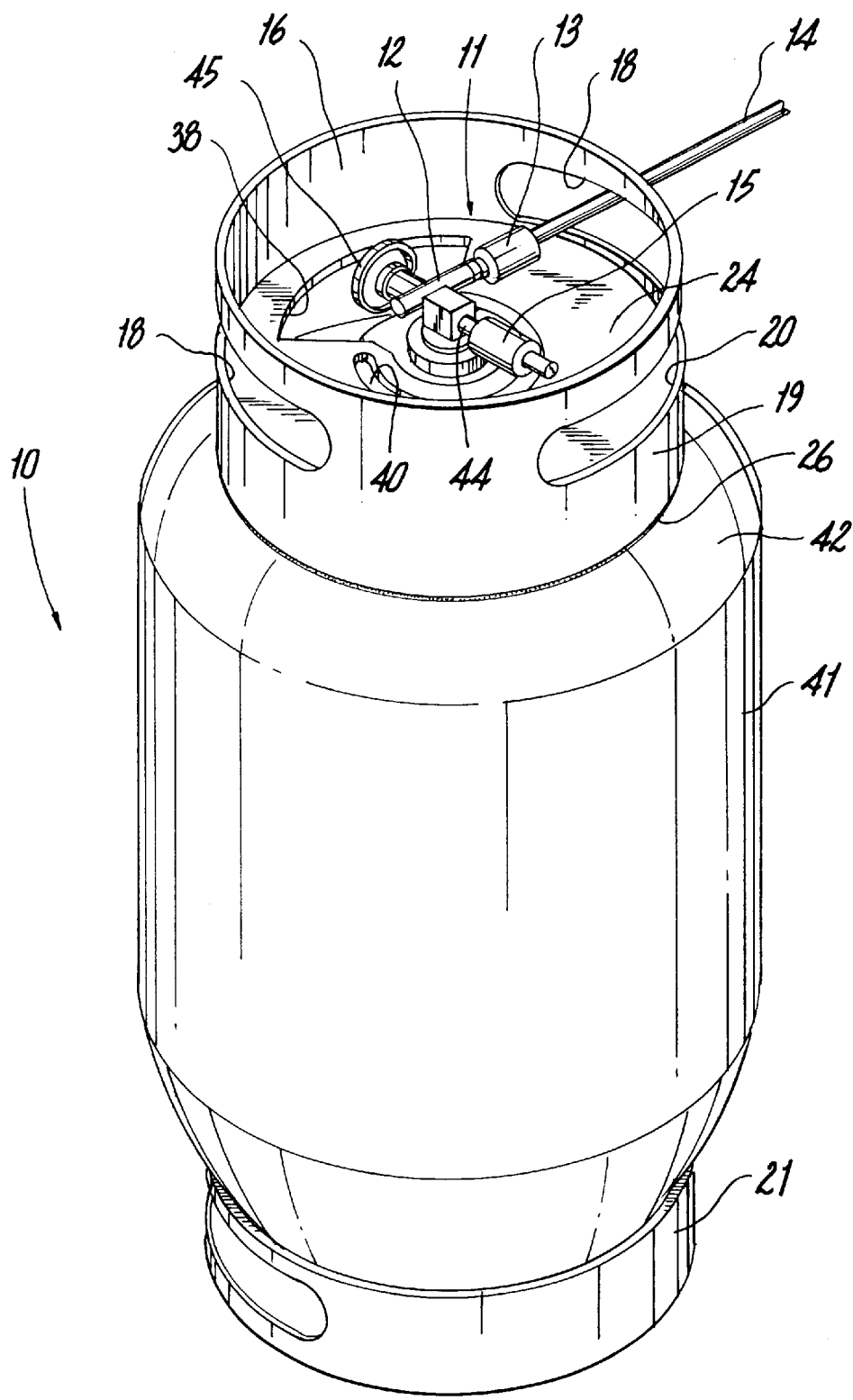
FIG. 1 is a perspective view, as viewed from the top, showing a valve collar attached to a compressed gas cylinder according to the present invention.

Referring now to FIG. 1, a compressed gas cylinder component protection assembly 10 is illustrated. The compressed gas cylinder assembly 10 includes a combination protective collar, hand grips, and a stand 16, 21 which enables the cylinder to stand vertically on either end.

The assembly 10 includes a lightweight full or partial composite (e.g., carbon fiber or fiberglass) compressed gas cylinder 41, an upper-protective valve collar 16, a lower-end plug collar 21, and a valve assembly 11. The valve assembly 11 includes a quick release valve coupling plug 12, valve socket 13, high pressure electrically conductive hose 14, and a pressure relief device 15. These devices, plug 12, socket 13, hose 14 and pressure relief device 15 are conventional, per se, and therefore need not be described further, as one of ordinary skill in the art would readily recognize how to make and use these devices in the assembly according to the present invention.

Figure 2:
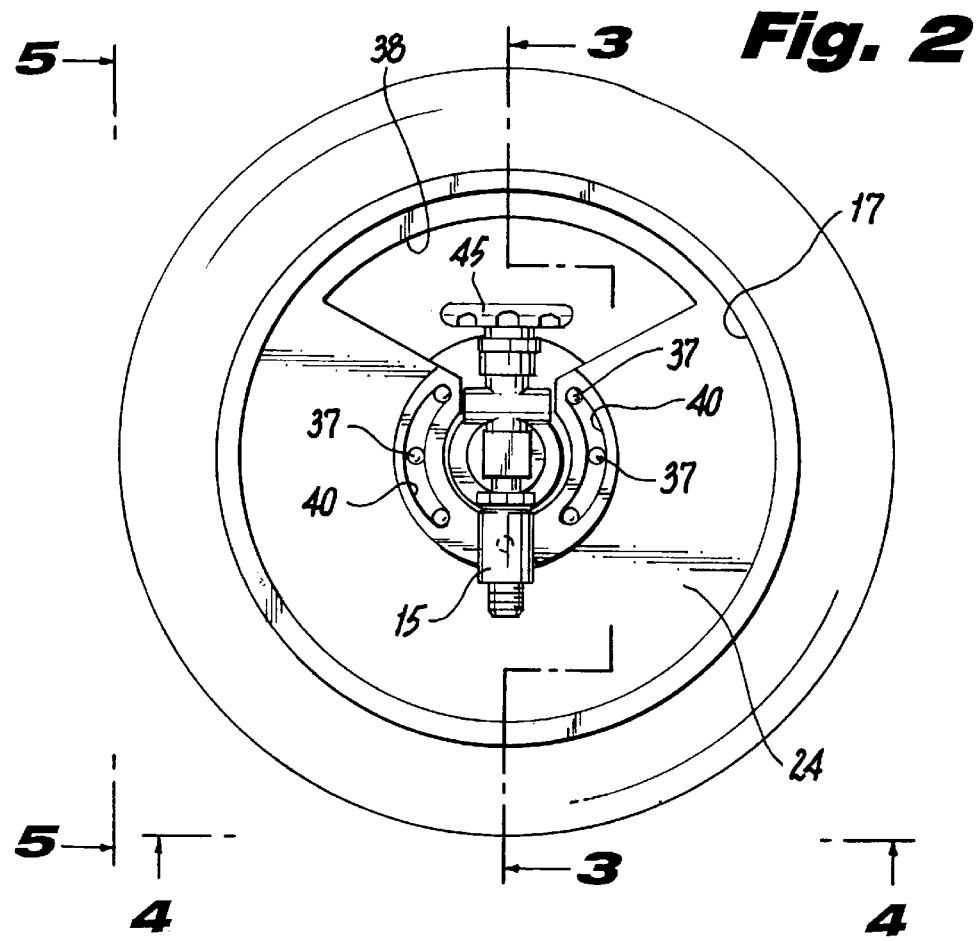
FIG. 2 is a top view of the valve collar.
Figure 5:
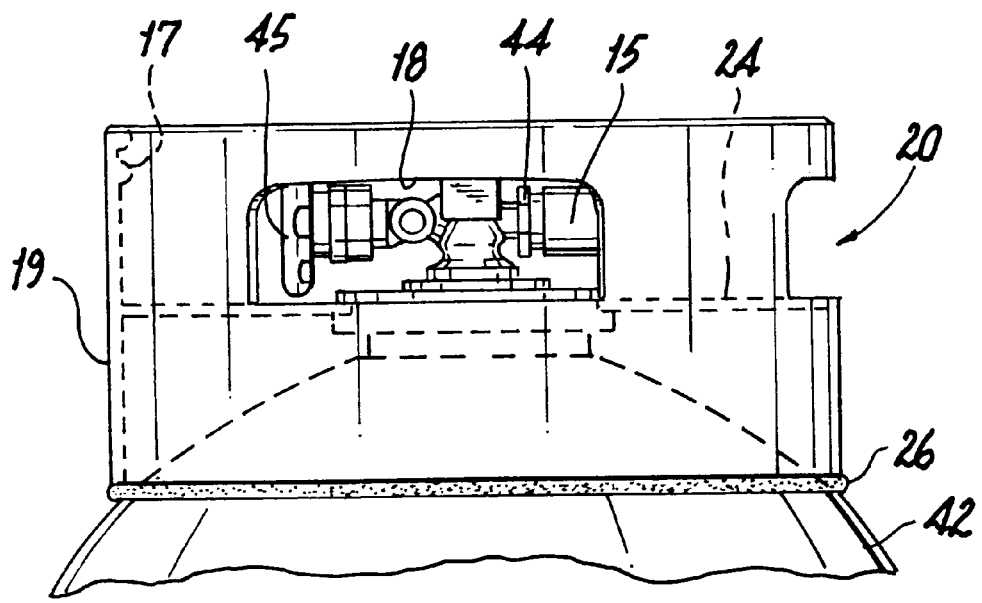
FIG. 5 is a left side view of the valve collar.
Figure 6:
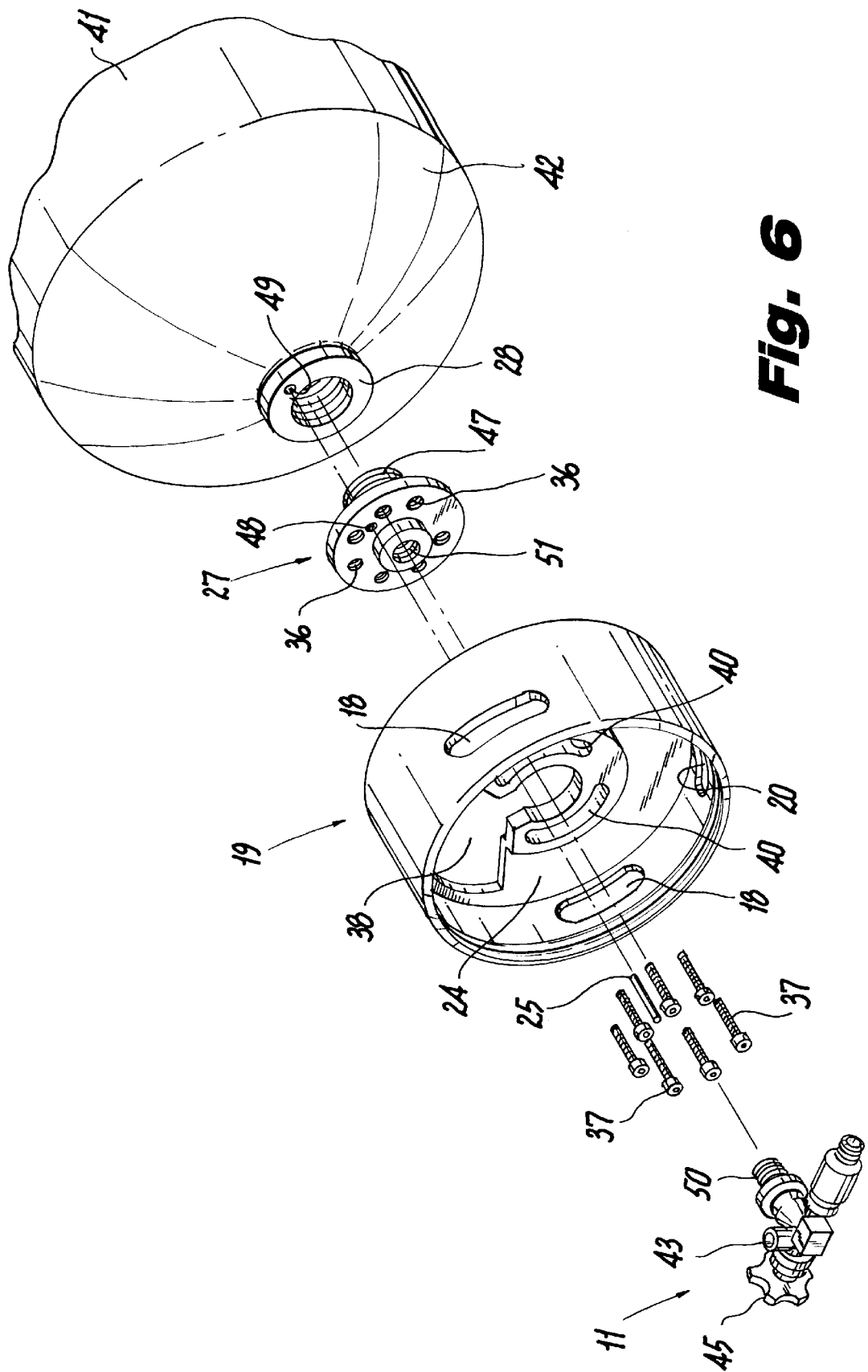
FIG. 6 is an exploded view of the cylinder and valve collar showing the assembly of the collar to the cylinder.

The valve collar assembly 16 is preferably comprised of a ring made from a single sheet of aluminum that has three elongated slots which act as handle grips 18 and as a gas pressure aperture 20. The slots can be stamped out prior to the sheet being bent into a cylindrical collar form. The valve collar ring 19 is then preferably bead welded together at the mating ends. A valve collar double ring 17 (FIG. 5) reinforces the upper inner edge of the valve collar ring and makes ring 19 more resistant to inward bending on impact, for example, with another object. Double ring 17 (FIGS. 3, 5) is bent into a cylindrical form and is bead welded at the mating ends. The cylindrical double ring 17 is then positioned on the inside wall of the upper edge of the valve collar ring 19 and is affixed in place to ring 19, preferably by tack welding. A valve collar plate 24 is disposed substantially in the center of the inside wall of the valve collar ring 19 and is preferably affixed to the inner cylindrical side walls by bead welding. The valve collar plate 24 contains a control valve aperture 38 as best seen in FIG. 2. This control valve aperture 38 is sufficient in size to allow a user's hand to fit over the valve assembly control valve handle 45 without interference, once the valve collar 16 is mounted to the collar mounting plate 27 (FIG. 6). Included on the valve collar plate 24 are a set of arcuate shaped mounting slots 40 (FIG. 6), the function of which will be described later. The valve collar assembly in its completed form is an elongated hollow cylindrically shaped device which is open at both its top and bottom ends, and which has a diameter less than that of the gas cylinder.

Referring to FIG. 6, the lightweight composite material compressed gas cylinder 41 has a cylindrical configuration and has a semi-spherical upper end 42. A cylinder boss 28 is centrally located on the semi-spherical end 42. This boss defines a threaded aperture, which in the prior art receives the threaded valve assembly. However, according to the present invention, the boss 28 is adapted to receive the threaded hollow stem 47 of the cylinder valve adapter/collar mounting plate 27. As noted, the cylinder boss 28 is internally threaded, so it can receive and secure the threaded stem 47 of the cylinder valve adapter 27 within the interior of the gas cylinder 41. Once the cylinder valve adapter stem 47 is seated and properly torqued into the interior of the cylinder, plate 27 and cylinder 41 are then pinned together by locking pin 25. The pinning takes place between the cylinder valve adapter or mounting plate 27 and the cylinder boss 28. A pin hole 48 is disposed in the collar mounting plate 27, which aligns with pin hole 49 in boss 28. To ensure the alignment of pin holes 48, 49, they are preferably drilled at the same time through the cylinder valve adapter plate 27 and into the cylinder boss 28, after plate 27 has been properly torqued to cylinder 41. The hole is drilled slightly undersize so that when the locking pin 25 is inserted into the two mated locking pin holes the result will be a press fit, ensuring a tight lock between the valve adapter and mounting plate 27 and the cylinder boss 28. The locking pin 25 prevents the cylinder valve adapter 27 from loosening or unscrewing with respect to the cylinder boss 28, which loosening could result in the leakage of gas. This loosening or unscrewing could occur, for example, when the valve collar is used, via the hand grips 18, to lift or move the gas cylinder.

With the cylinder valve adapter plate 27 securely fastened to the cylinder 41, the threaded stem 50 of cylinder valve 11 can be screwed and torqued into the internally threaded bore 51 in the cylinder valve adapter plate 27. Bore 51 is coextensive with the hollow stem 47. To accommodate the adaptor plate 27 and the valve assembly, the threaded aperture in boss 28, the stem 47, the threaded bore 51 in plate 27 and the valve stem 50 must be properly sized. If conventional size valve stems and boss apertures are used, the stem 47 and bore 51 of plate 27 must be of different sizes to allow for the connections.

Figure 3:
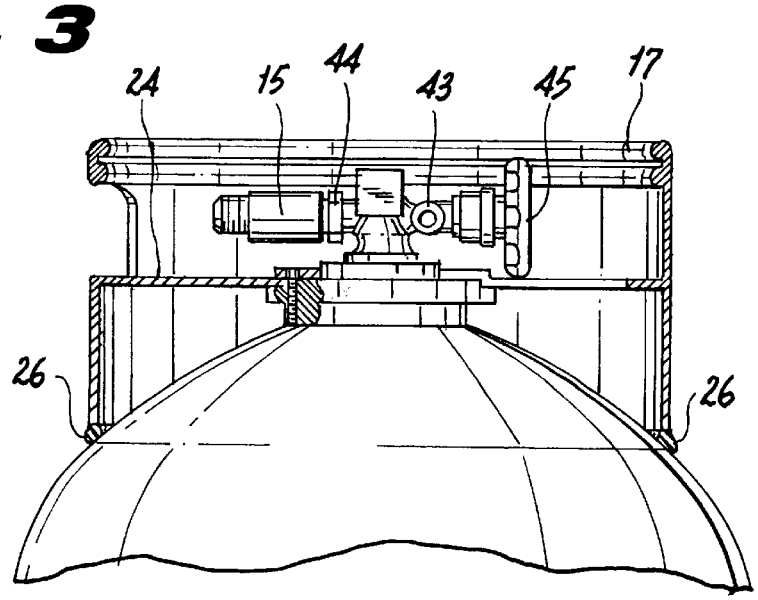
FIG. 3 is a side right side view, partially broken away, showing the interior of the valve collar installed on a gas cylinder.

The valve assembly 11, which is used in the filling and dispensing of gas from the cylinder, includes a control valve 23 for regulating the flow of pressurized gas through a valve outlet gate 43 (FIG. 3). A quick release coupling valve plug 12 (FIG. 1), with its externally threaded end portion, is screwed and torqued into the internally threaded valve outlet gate aperture 43. A pressure relief device (PRD) 15, with its internally threaded end portion, is screwed and torqued into the externally threaded valve assembly pressure outlet gate 44 (FIGS. 3 and 5). This PRD 15 acts as a safety valve for preventing the build up of excessive gas pressure within the cylinder by providing a safe exit conduit for the escape of any excessive gas pressure, thus effectively eliminating or at least substantially minimizing the possibility of an explosion hazard. Gas pressure aperture 20 is an opening in ring 19 which is aligned with PRD 15 to ensure that any released gas will vent properly.

Returning to FIG. 6, the assembled valve collar 16 is placed on the top end of the cylinder and is fitted over the valve assembly 11. The valve collar 16 is positioned to make the valve assembly control valve 23 and handle 45 readily accessible through aperture 38 and from the open top of the collar 16. This will permit easy access to the valve handle 45 and allow for valve handle rotation to the "on" or "off" positions merely by reaching into the open end. Machine bolts 37, having enlarged hexagonal head portions that are larger in size than the crescent-shaped mounting slots 40, are axially inserted through the mounting slots 40. The machine bolts 37 are aligned with and are received in oppositely disposed axial internally threaded mounting holes 36 in the collar mounting plate 27. The valve collar control valve aperture 38, gas pressure relief aperture 20 and the hand grip apertures 18 must be aligned in relationship to the valve assembly 11. This alignment is accomplished by the use of the crescent-shaped mounting slots 40. The arcuate-shaped mounting slots 40 are preferably designed to allow for collar rotation from zero to twenty-two and one half degrees left or right of center. This rotation capability insures proper alignment of the collar apertures 38, 20 and 18 in relationship to the valve assembly 11. Upon completion of alignment, the machine bolts 37 are tightened and torqued in place.

Figure 4:
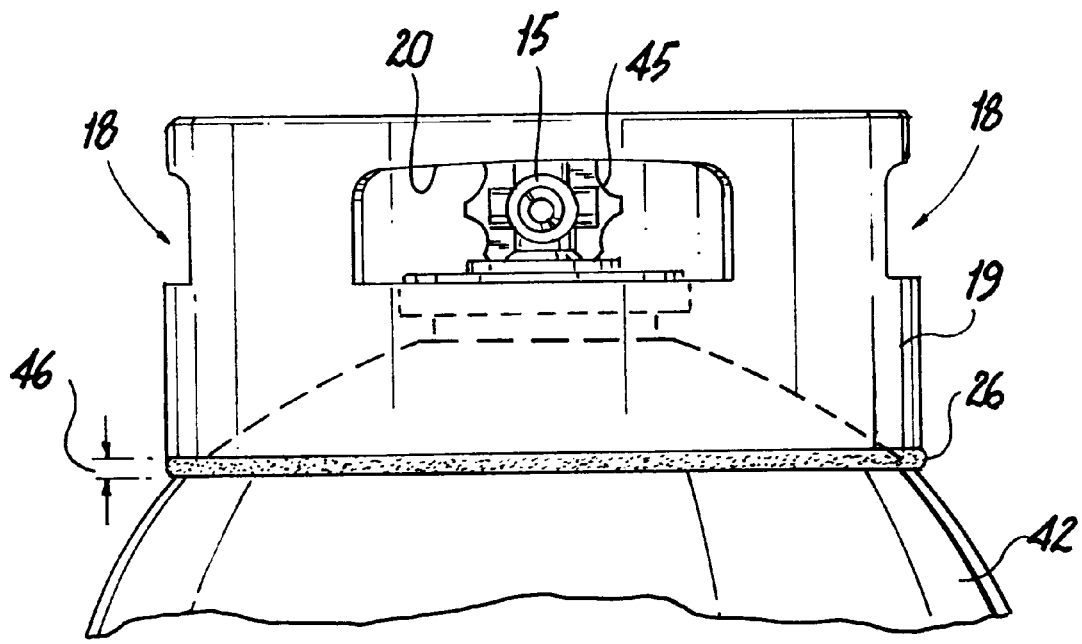
FIG. 4 is a front view of the valve collar.

With the valve collar 16 tightly secured to the collar mounting plate 27, there will be a gap 46 disposed between the bottom edge of the valve collar 16 and the outside wall of the semi-spherical upper end 42 of the cylinder 41 (FIG. 4). A bead of a conventional flexible weather resistant silicone rubber material 26 is applied to the gap 46 area. The silicone rubber bead 26 acts as a cushion or gasket to protect against chafing between the valve collar 16 and the cylinder wall 42. This same silicone rubber material 26 also acts as an adhesive to prevent torquing or rotation of the collar during handling cycles.

The filling with and dispensing of gas from the cylinder valve assembly is accomplished as follows. A flexible conduit, such as the elongated high pressure hose 14, is securely twinned to a quick release coupling valve socket 13. The flexible high pressure hose 14 should be electrically conductive to prevent the accumulation of static electricity, a safety feature which must be considered in the handling of compressed natural gas cylinders. With the quick release coupling valve plug 12 securely torqued in place within the valve outlet gate 43 of the control valve 23, the quick release coupling valve plug 12 is ready to receive the quick release valve socket 13 and high pressure hose 14. When the quick release valve couplings, 12 and 13, are mated and the control valve 23 is turned on, the released pressurized gas can be transported to its final destination through the flexible high pressure hose 14. The quick release coupling valve plug 12 and valve socket 13 are provided with built-in check valves. These built-in check valves prevent the escape of any pressurized gas from either of the quick release valve couplings, 12 and 13, in the event that the quick release valve socket 13 should be inadvertently uncoupled from the valve plug 12.

The arrangement of the quick release couplings 12 and 13, the high pressure hose 14 and the pressure relief device 15 is not only accessible through the opening at the top of the valve collar 16, but are also accessible through the collar hand grip apertures 18 and the pressure relief aperture 20. The hand grip apertures 18 are large enough to receive the hand of a user, and will also allow the flexible high pressure hose 14, with its twinned quick release coupling valve socket 13, to pass freely therethrough for connection to the valve assembly. The outer edge of the handles or hand snap apertures are rolled, e.g., by a portion of double ring 17, to reduce the stress on the hand when carrying the cylinder.

Figure 7:
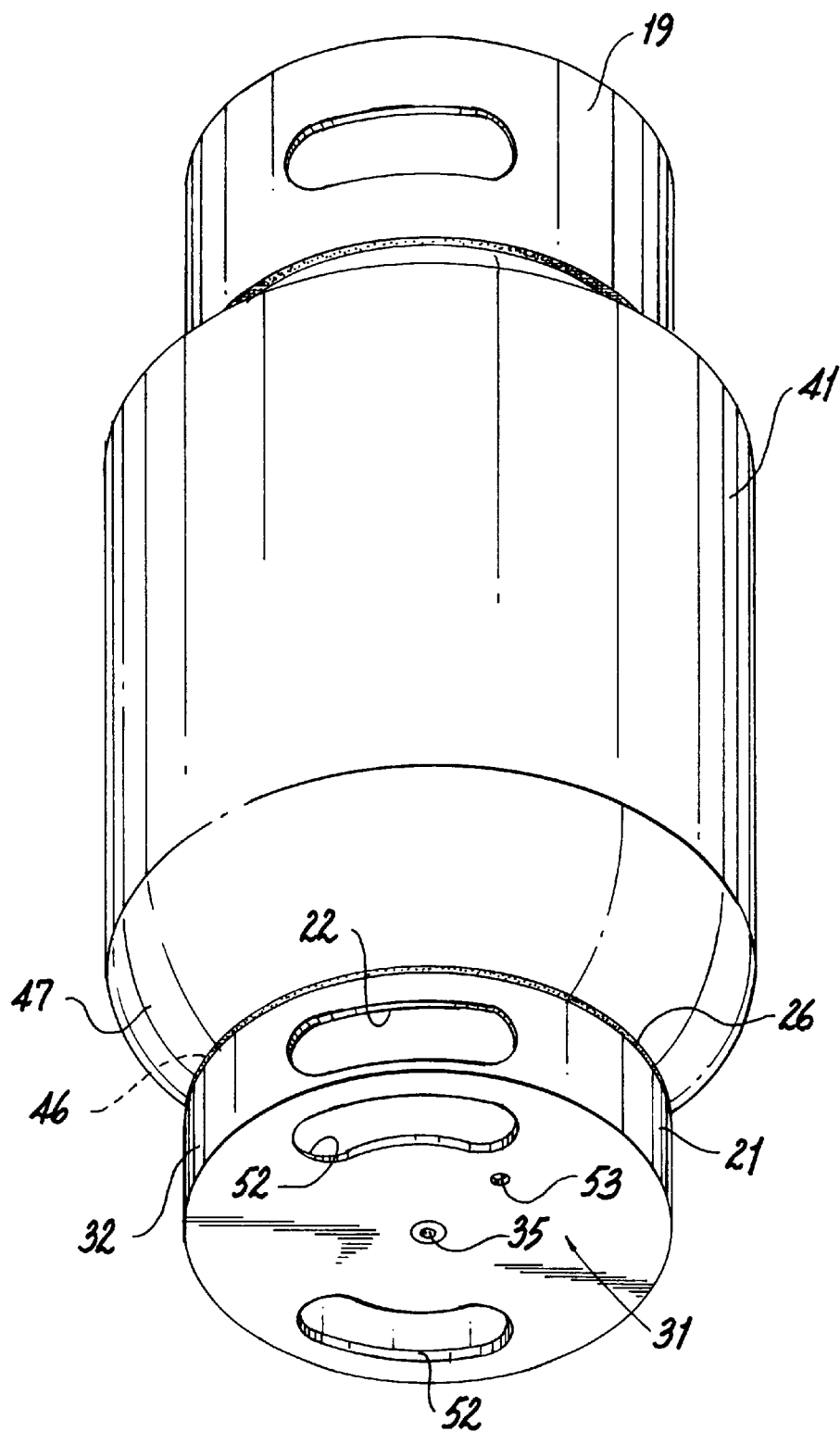
FIG. 7 is a perspective view, as viewed from the bottom, showing the base or end plug collar attached to a compressed gas cylinder.

Referring now to FIGS. 7 and 8, the end plug collar assembly 21 is shown as a ring, which is preferably made from a single sheet of aluminum. Handle grip apertures 22 may be stamped out prior to the sheet of aluminum being bent into a cylindrical form. Once bent into this cylindrical form, the collar ring itself 32 can then be welded together at the mating ends. The end plug collar plate 31, which is circular in shape, may include two handle apertures 52, a countersunk mounting hole 35 and a locking pin hole 53. The collar plate 31 is placed on the collar ring 32 with the handle apertures 22 and 52 aligned with respect to each other. Once these handle apertures are aligned, the end plug collar ring 32 and the end plug collar plate 31 are fixedly connected together, for example by welding, which results in a completed end plug collar assembly 21. The end plug collar assembly in its completed form is a hollow cylindrically cup-shaped device that is open on one end and closed at the other end, and has a diameter that is less than the gas cylinder on which it is mounted.

An externally threaded end plug 34 is threaded into an internally threaded cylinder plug boss 33 of cylinder 41 for receiving and securing plug 34 to the base of the gas cylinder. With the end plug 34 tightened and torqued in place, the assembled end plug collar 21 is placed on the bottom end of the cylinder 47 and is fitted over the end plug 34. A flathead screw socket bolt 30 is inserted through the end plug collar countersunk mounting hole 35 and is aligned with and received by an internally threaded mounting hole 29 of the end plug. Prior to the final tightening and torquing of the flathead socket bolt 30, the end plug collar 21 should be rotated so that the handle apertures 22 and 52 align with respect to the valve collar handle aperture 18 at the other end of the cylinder. Upon completion of this alignment, the flathead socket bolt 30 is then tightened and torqued in place.

Using the locking pin hole 53 as a pilot hole, a mating locking pin hole 54 can be drilled into the cylinder end plug boss 33, thus assuring that both locking pin holes are aligned with each other. The pin holes 53, 54 are drilled slightly undersize so that when a locking pin 39 is inserted into the two mated locking pin holes, a press-fit will result which ensures a tight lock between the end plug collar 21 and the cylinder boss 33. Locking pin 39 prevents the end plug 34 from rotating with respect to the cylinder and hence keeps the and plug 34 from loosening or unscrewing from the cylinder boss 33, which might occur when the end plug collar handle apertures 22 and 52 are used to lift or move the gas cylinder about. Thus, locking pin 39 effectively prevents an inadvertent leakage of gas. End plug 34 may further be prevented from rotation if the locking pin engages a facet of the hex shaped head of the plug 34.

With the end plug collar 21 tightly secured to the end plug 34, there will be a gap 46 disposed between the bottom edge of the end plug collar 21 and the outside wall of the semi-spherical bottom end 47 of the cylinder. A bead of a conventional, flexible, weather resistant silicon rubber material 26 is preferably applied to the gap area 46. The silicon rubber bead 26 acts as a cushion or gasket to protect against chafing between the end plug collar 21 and the cylinder wall 47. This same silicon rubber material 26 also acts as an adhesive to prevent torquing or rotation of the collar during the handling cycle.

It should be understood that the form of this invention detailed herein is to be taken as a preferred example of the same, and this invention is not to be limited to the exact arrangement of the parts shown in the accompanying drawings or described in the specification, that the cylinder collars illustrated and detailed herein may be constructed of any high impact material (e.g. metal) capable of protecting the valve assembly and other cylinder components from damage or abuse. The cylinder itself may be made of metal, but preferably is made of a high impact, synthetic composition material.

Figure 9A:
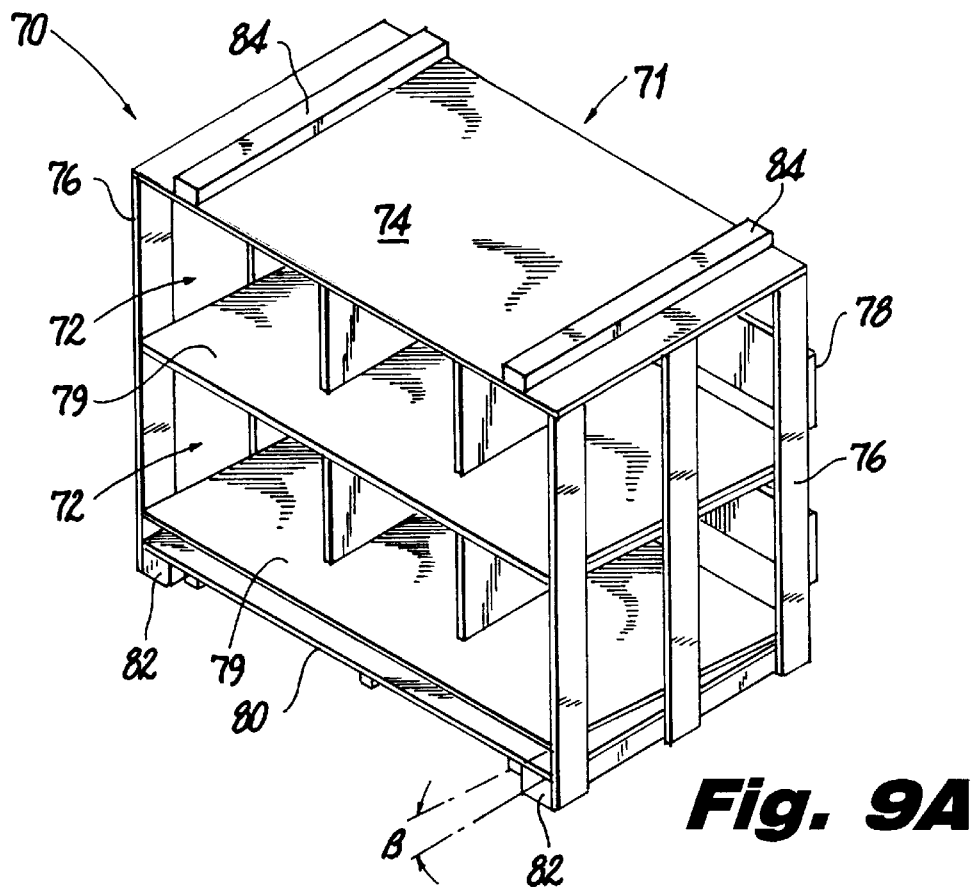
Figure 9B:
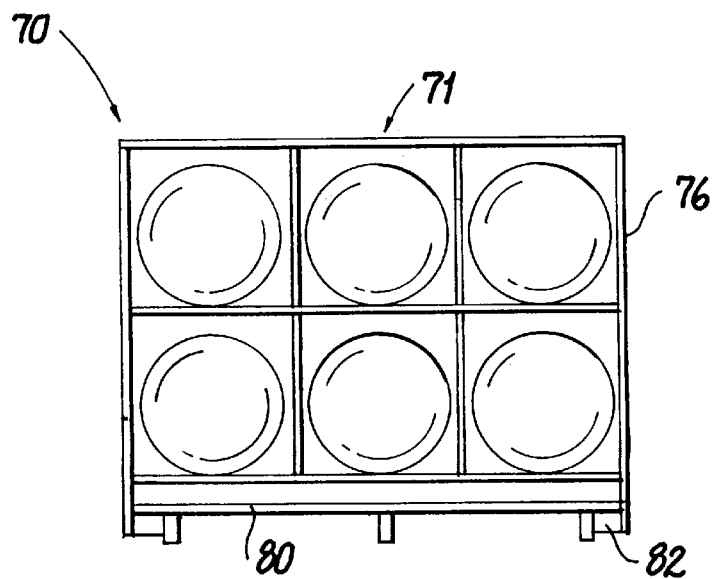
Figure 9C:
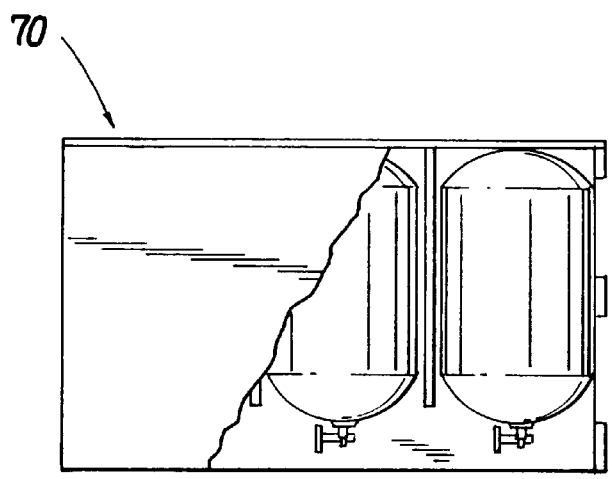
Figure 9D:
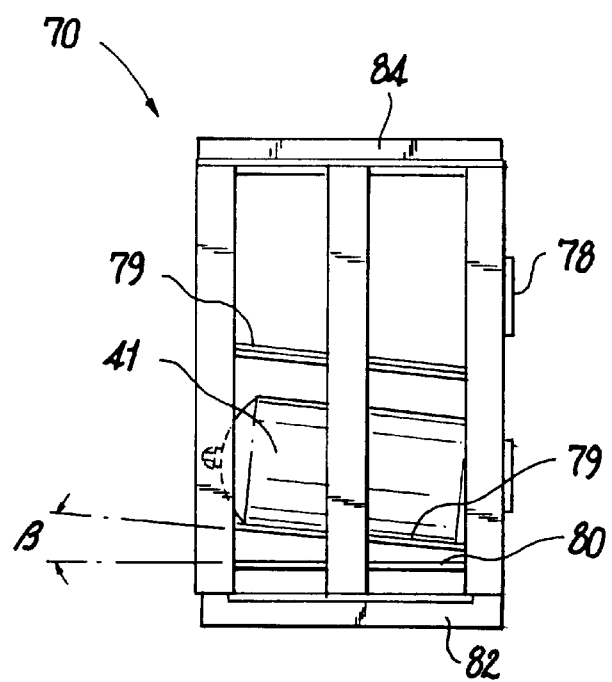
Figure 9E:
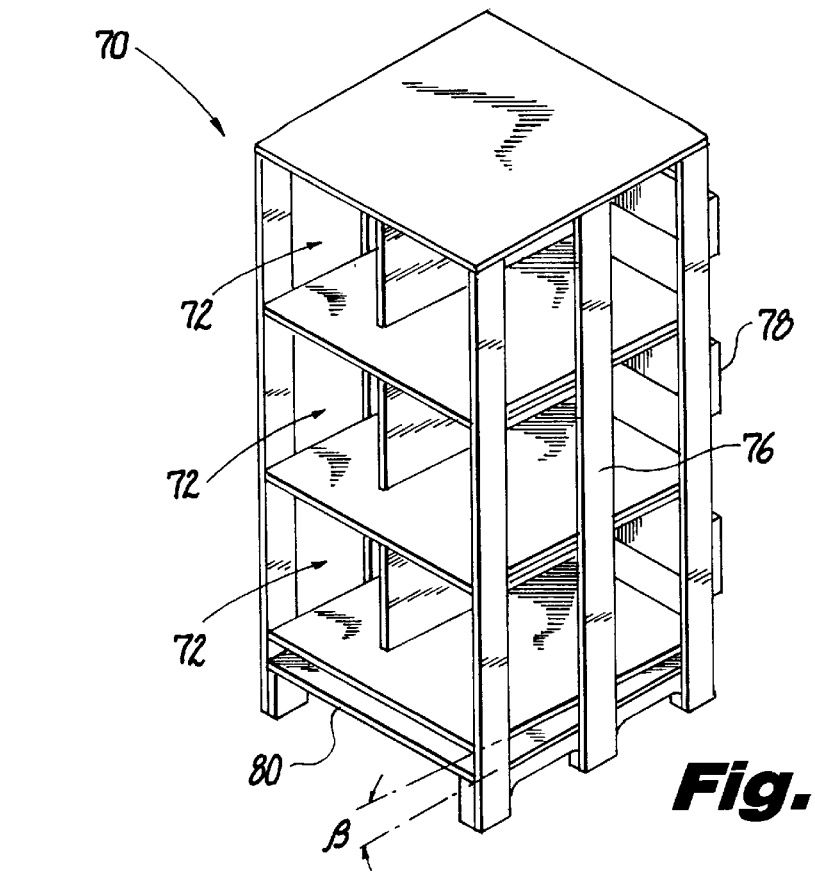
Figure 9F:
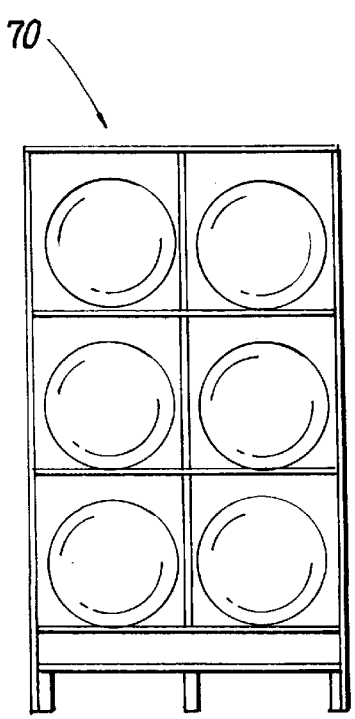
Figure 9G:
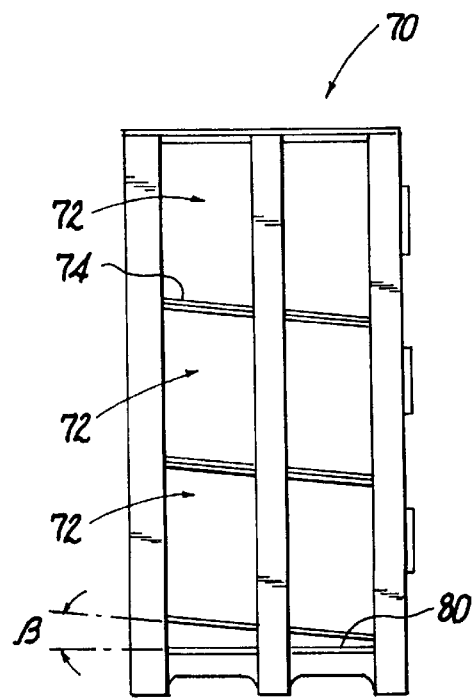

FIGS. 9A–9I illustrate the racks or crates in which the cylinder can be stored or transported in a generally horizontal configuration that allows for a high density of cylinders. FIG. 9A illustrates a rack 70 with three pairs of compartments 72. The racks are designed so that a cylinder 41 will lie in a horizontal position in a compartment with the outer or valve end of the cylinder being slightly raised (e.g. by about 6°) with respect to the inner or base end of the cylinder. See FIG. 9C for a cut away view showing the placement of the cylinders in the crates. The crates or racks 70 are comprised of a frame 71 that divides the crate into a plurality of individual compartments 72, e.g. six compartments are illustrated in FIGS. 9A–9D arranged three cylinders across and two cylinders high. The racks of FIGS. 9E–9G also have six compartments, but they are arranged two cylinders across and three high. The racks of FIGS. 9H–9I have nine compartments arranged 3 by 3. Of course the racks can be designed to hold any number of cylinders in any configuration so long as they can be conveniently stored and/or lifted by a forklift truck. Each of the compartments has an open front and is defined by a top wall 74, a pair of side walls 76, a rear wall 78 and a bottom wall 80. The bottom wall 79 in each compartment is sloped downwardly from the front to the rear by an angle β of less than 20°, preferably at an angle β of about 6° (FIG. 9D). The bottom 80 of the crate is configured with extensions 82 to raise the bottom to receive the tines of a conventional forklift truck. The side walls, rear wall and top wall of the crates permit the free flow of air through the crates so that any natural gas which may be inadvertently released from the gas cylinders 41 will be immediately vented.

As shown in FIGS. 9A and 9D, the crates have extensions 84 on their top walls 74 to allow for secure stacking because these extensions fit just inside the extensions 82 on the bottom of another rack placed on top of it.

Referring now to FIGS. 10–15, the gas cylinders 41 can be stored and shipped in their specially designed racks 70, in a compressed gas cylinder delivery truck 110. Truck 110 has a dropped body 112, flexible roll-down doors 114 for each of the vertical compartments 116, and a gas venting module system 118, which provides a constant unrestricted flow of air (indicated by arrows A) through the truck body. The gas venting module system 118 consists of louvers 119, 121 that will admit air into and exhaust it from the truck body and at the same time, sheds rain water outward. These louvers 119, 121 are located in the upper portion of the outer front and rear walls of the truck body. The flow of air from the front to the rear of the truck body is provided in the following manner: as the delivery truck moves forward, outside air enters through the front louvers and exits through the rear louvers (121 in FIG. 15). This flow of air as it moves through the upper portion of the truck body, creates a suction effect which pulls air upwards from the bottom portion of the truck body where the delivery crates and gas cylinders reside. This constant moving of air prevents any significant accumulation of gas pockets in the unlikely event of a gas leak.

Figure 10:
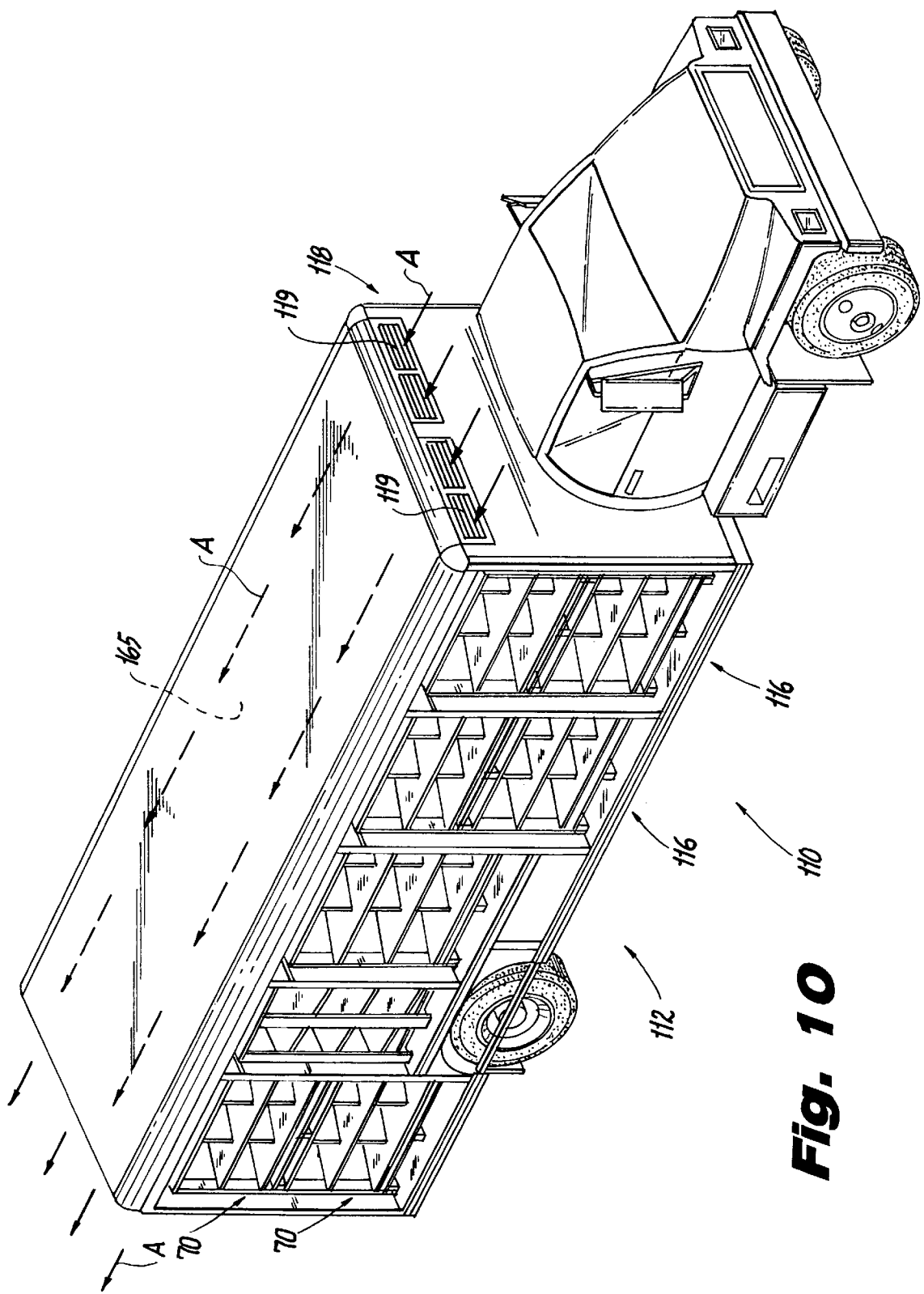
FIG. 10 is a perspective view, as viewed from the top, of a delivery truck according to the present invention.
Figure 12:
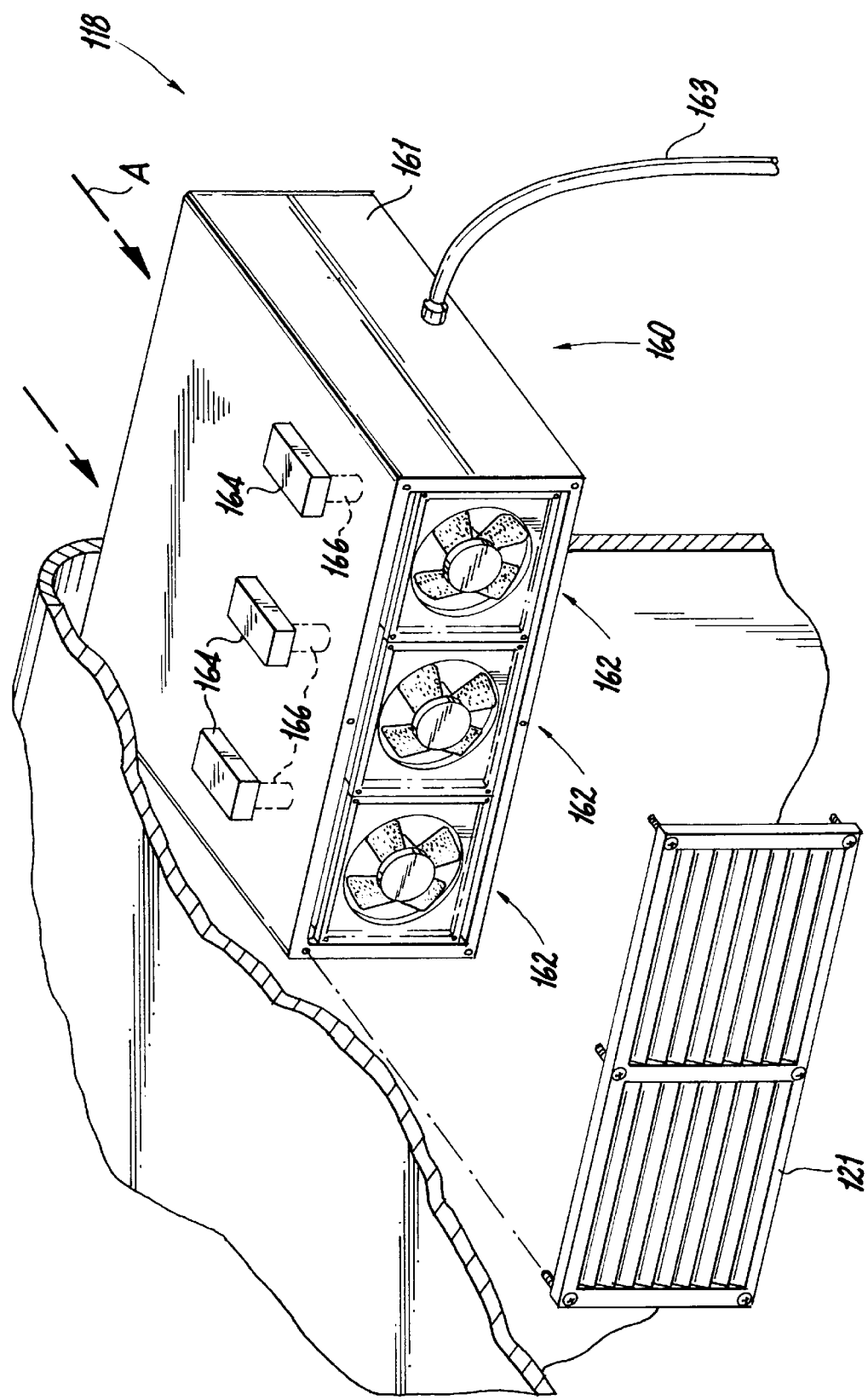
FIG. 12 is a perspective view of a gas venting module according to the present invention.
Figure 15:
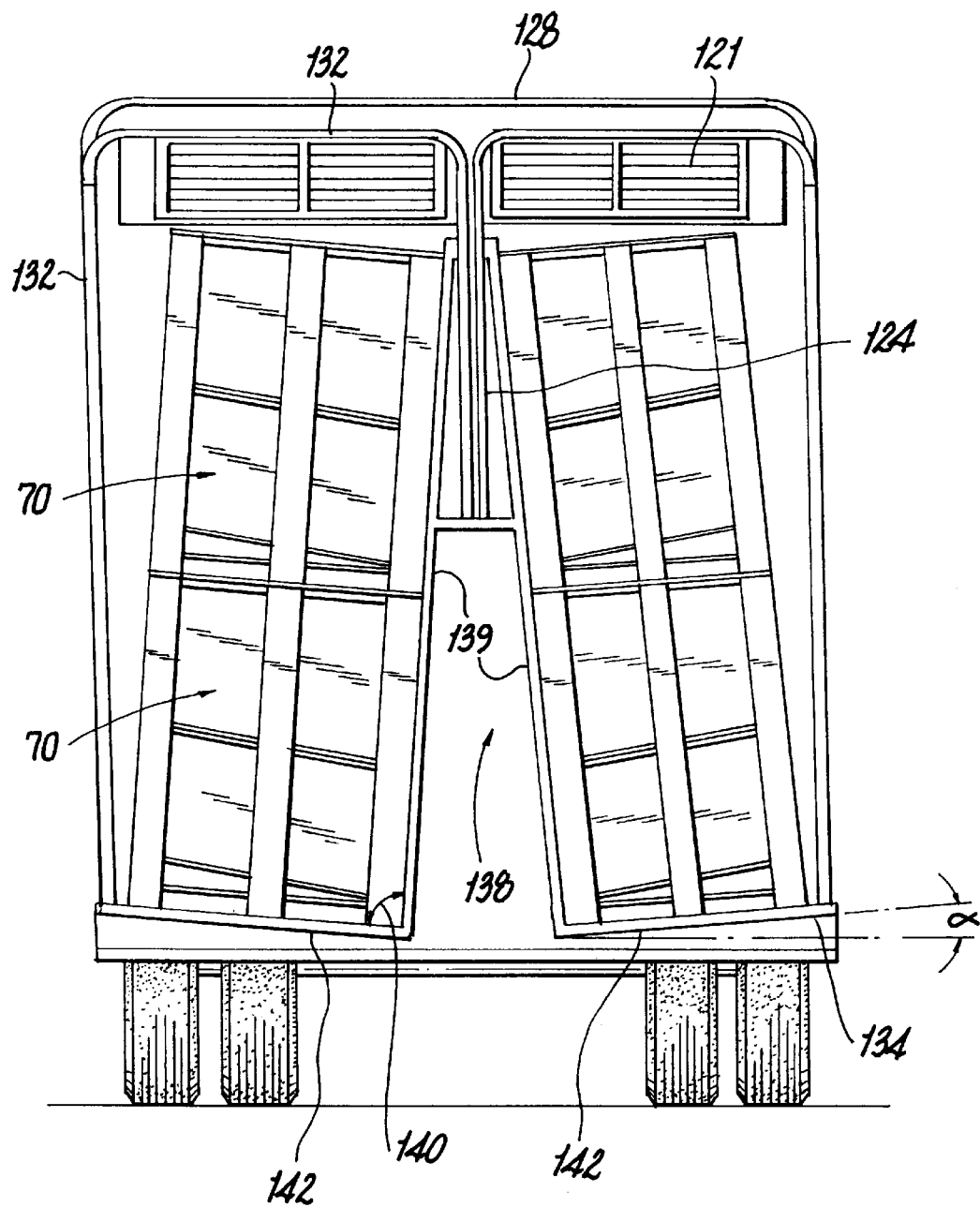
FIG. 15 is a rear view, partially broken away, of the delivery truck.
Figure 16:
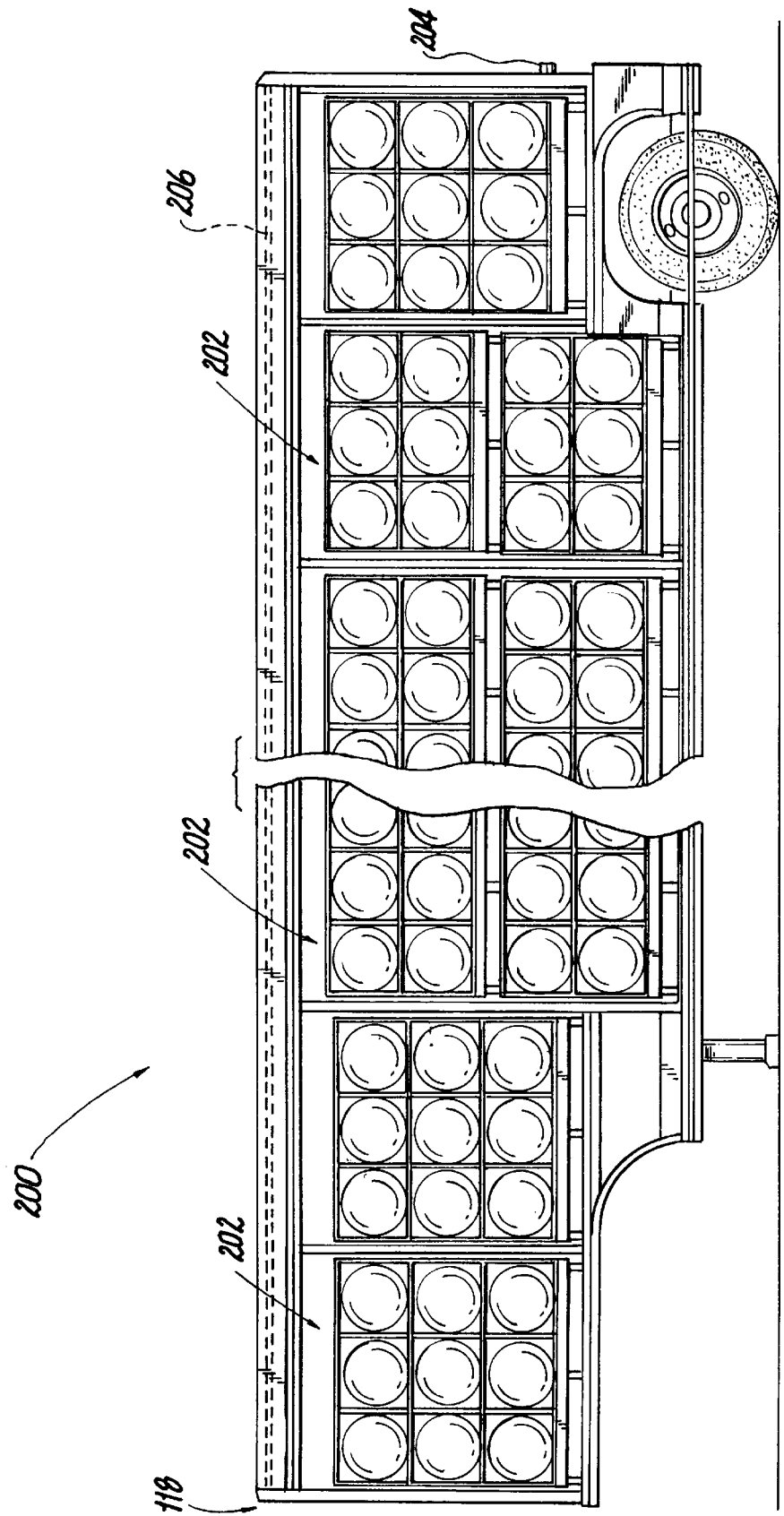
FIG. 16 is a side view of the trailer portion of the refueling truck according to the present invention.
Figure 17:
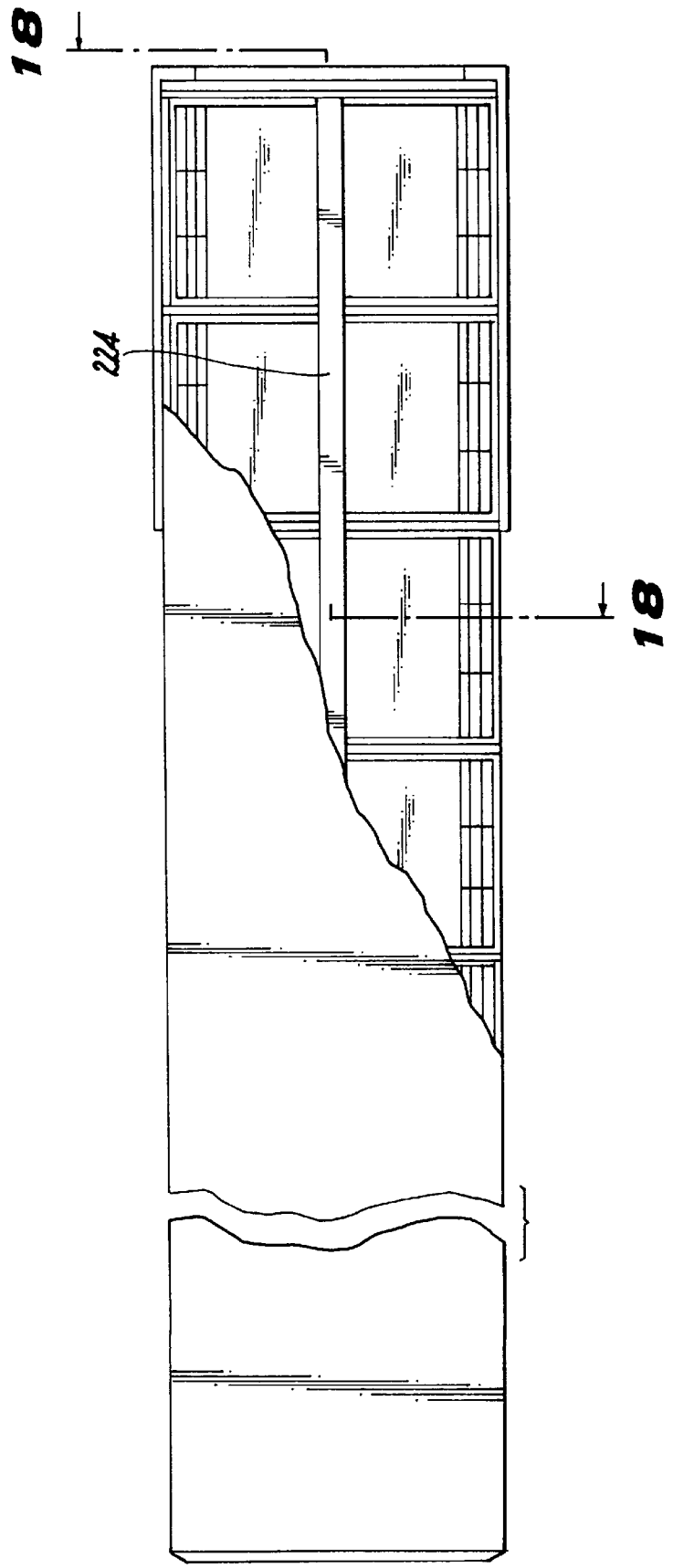
FIG. 17 is a top view of the refueling truck, partially broken away, according to the present invention.

FIGS. 10 and 12 show the use of four exhaust fan modules 118. Of course, the fan modules 118 could be disposed in the front of the truck, at the back of the truck or at both the front and the rear of the truck. A single exhaust fan module 118 is shown in FIG. 12 mounted on the inside of the rear/front vertical wall, installed directly inside of the louver 119 at an air duct assembly 160. However, the fan modules 118 are preferably mounted inside of the rear louvers 121 mounted on the rear wall 145, as illustrated in FIGS. 12 and 15. The air duct assembly includes an air duct 161, three rotary exhaust fans 162, and three air flow interlock switches 164. The function of the air duct 161 is to contain and direct the air flow toward the truck body rear louvers 121. The three rotary fans 162 produce the air flow required to move the inside air of the truck body to the rear louvers when the truck is moving slowly or not at all. The air flow interlock switches 164 monitor the amount of air flow so that the fans are turned on if the air flows due to the motion the truck drops below a certain value, i.e., the air flow interlock switch 164 is activated by air velocity. The switch 164 is mounted on the outside of the air duct and includes stainless steel air flow veins 166, which protrude through a hole in the duct and into the air stream. A snap action switch is deactivated, which turns the fans off, when the velocity pressure against the vein moves in the direction of the air flow. As the velocity of the air stream stops or decreases to a predetermined minimum value, the air flow switch moves towards its original position and activates the fans on to continue the flow of air.

The use of brushless motor driven exhaust fans eliminate the possibility of electrical sparks which are produced in the use of a standard exhaust fans. Thus these brushless exhaust fans eliminate the possibility that operation of the fan modules 118 could inadvertently ignite any substantial accumulation of gas in the truck body. The brushless motor driven exhaust fans and air flow interlock switch are commercially available products from, for example, EG & G Rotron of Woodstock, N.Y.

If three fan modules 118 are needed for adequate ventilation, the use of four exhaust fan modules is a safety feature. In the event one of the exhaust fan modules 118 malfunctions, the remaining three modules are fully capable of carrying the required air flow load.

A cord 163 is shown in FIG. 12, which can be used to connect auxiliary power to the fan modules 118 so that power can be supplied to them when the vehicle engine is turned off, e.g., during overnight parking and refilling of the gas cylinders.

Figure 11:
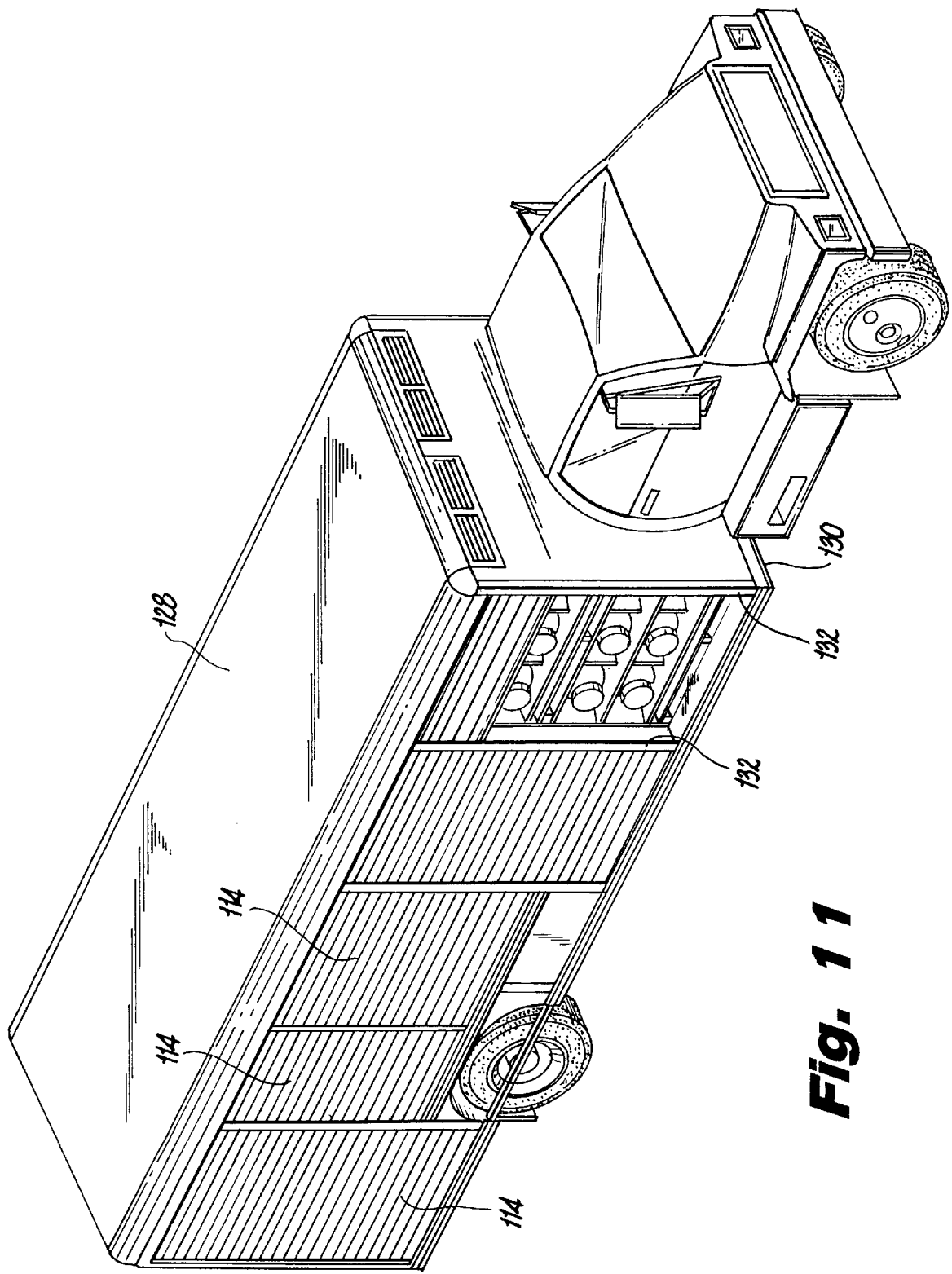
FIG. 11 shows the delivery truck with flexible roll-down doors in various positions.

The truck has an open space 165 (FIG. 15) disposed above and in fluid communication with the storage bays. Open space 165 is disposed along the entire upper portion of the truck, is about one foot in height, and is disposed between louvers 119, 121. This is the area into which escaped gas will be drawn and then exhausted out the back louvers 121. The truck dropped body 112 is rectangular in shape and has a vertically disposed central wall 124 (FIGS. 14 and 15), which runs lengthwise along the full length of the rectangular truck body base. A number of vertical walls 126 are disposed on opposite sides of the central wall 124. Walls 126 are preferably disposed at right angles with respect to wall 124. Walls 126 are spaced in parallel relationship with respect to each other. The truck has a rectangular rooftop 128 (FIG. 11) positioned above a rectangular base portion 130 of the truck body and supported, at least in part, by the vertical central wall 124. The base 130, rooftop 128 and a vertical walls 124, 126 form a number of totally independent compartments or bays 116 (FIG. 10). These independent bays each have a counterbalanced, flexible roll-down door 114 (FIG. 11). Mounted to each side of the bay 116 are respective track members 132 to guide the roll-down doors 114. The truck floor 134 of each independent bay 116 is disposed at an angle and with respect to a horizontal reference plane.

Figure 13:
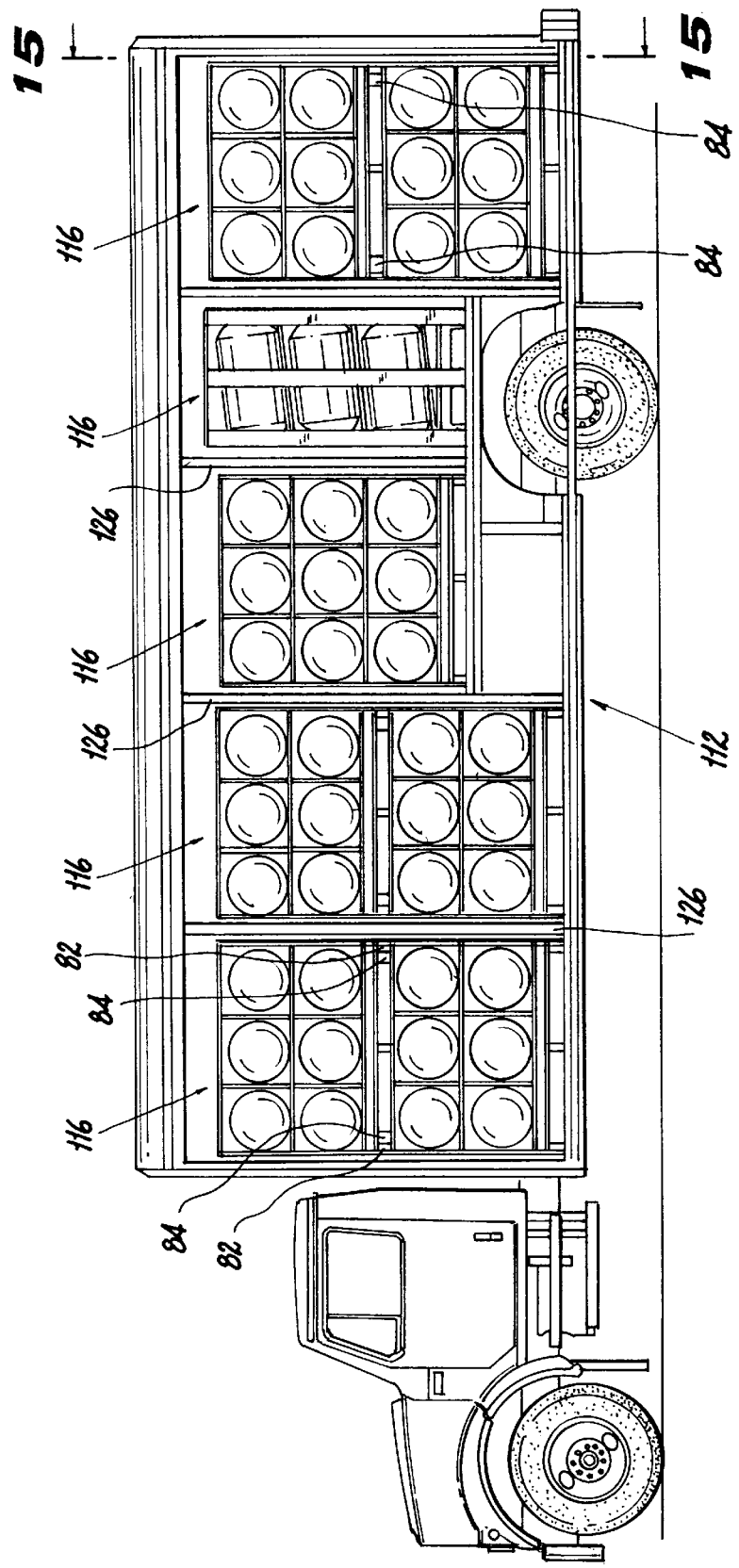
FIG. 13 is a side view of the delivery truck according to the present invention.
Figure 14:
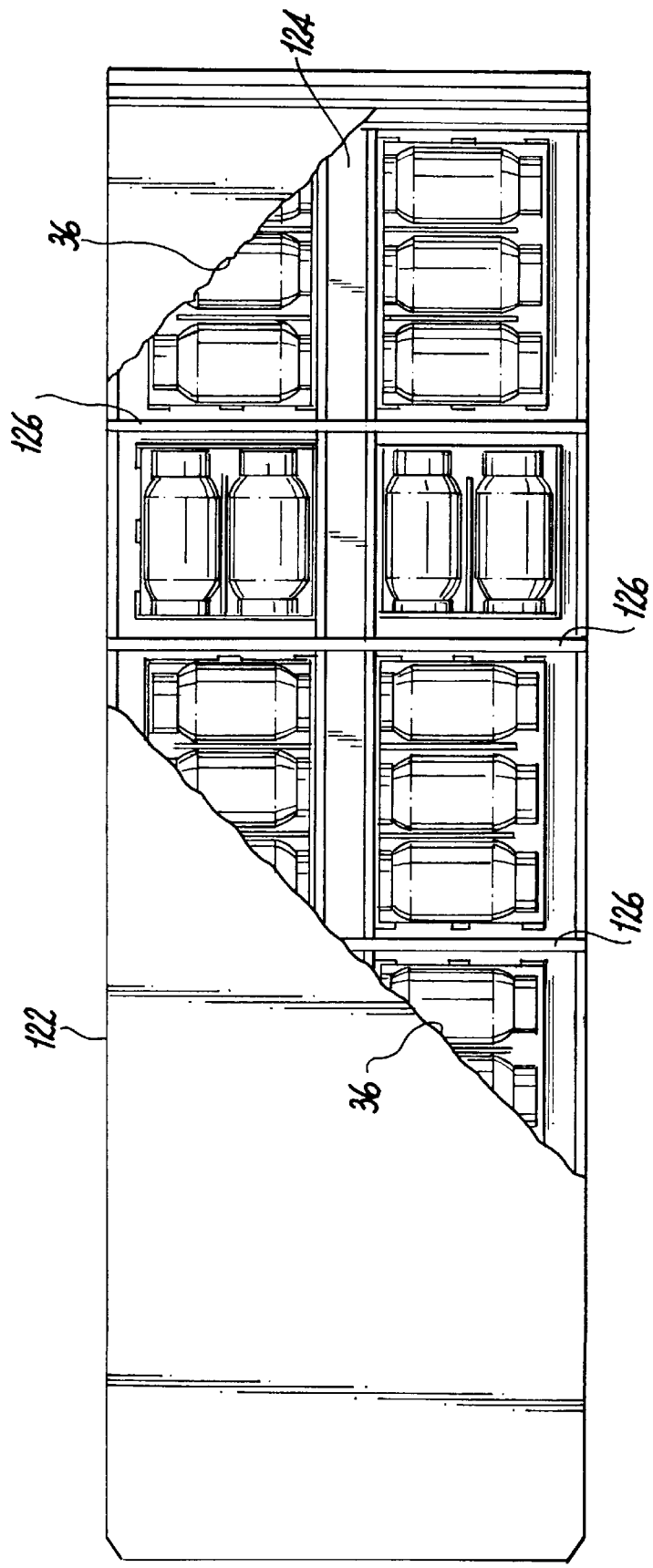
FIG. 14 is a top view partially broken away of the delivery truck according to the present invention.

FIG. 13 is an elevation side view of the compressed gas cylinder delivery truck 110 illustrating each of five independent compartments or bays 116 on one side of the truck body. These compartments are duplicated on the other side of the truck. In three of these bays the racks of cylinders can be stacked two high and locked together by extensions 82, 84. The top plan view of FIG. 14 depicts a roof section 136, partially broken away to show the compact placement of the delivery racks and the cylinder placement.

FIG. 15 shows a partial cross-section from the rear of the compressed gas cylinder delivery truck body 10, with the section being taken along lines 15—15 of FIG. 13. The body compartment is symmetrical with the roof portion 128 being generally flat and horizontal. The floor portion 134 is disposed such that it slopes at an upward angle of 6° from the center section of the truck to the outer side edges. The central lengthwise arranged wall 124 is vertically positioned and intersects the flat roof portion at right angles. An upper portion of a centrally positioned A-frame 138 is connected to the central wall 124. The upright rear walls 139 of the A-frame are disposed at right angles 140 with respect to the floor portion 134. The downward 6° slope of the truck body bed, combined with the downward 6° slope of the cylinder rack shelves causes the cylinders to be sloped at a 12° angle with respect to a horizontal reference plane. The use of the flexible roll-down doors for each cylinder rack storage bay will ensure safe delivery of the gas cylinders to the delivery sites.

Referring now to FIGS. 16–20, a refueling/delivery truck is shown, which can be utilized with the cylinders and crates of the present invention so that the empty cylinders can all be refilled simultaneously without requiring the cylinders to be removed from either the crate or from the refueling truck. The refueling vehicle 200 is a trailer that has a dropped body and can be towed by a truck cab in a conventional manner. The refueling truck is divided into eight substantially rectangular vertical compartments 202 on each side, which are substantially similar to the compartments 116 in the delivery truck 110 and can be seen, in part, in FIG. 16. Of course, depending upon the size of the vehicle, the number of vertical compartments 202 can be either increased or decreased accordingly. The refueling truck also includes a gas venting module system 118 to ensure the continuous flow of air through the interior of the refueling truck to prevent any significant accumulation of natural gas pockets in the unlikely event of a gas leak. The internal structure of the vehicle to receive the cylinder racks 70 and for venting gas is substantially the same as that described above for the delivery truck and will not be described further for the sake of brevity.

Figure 18:
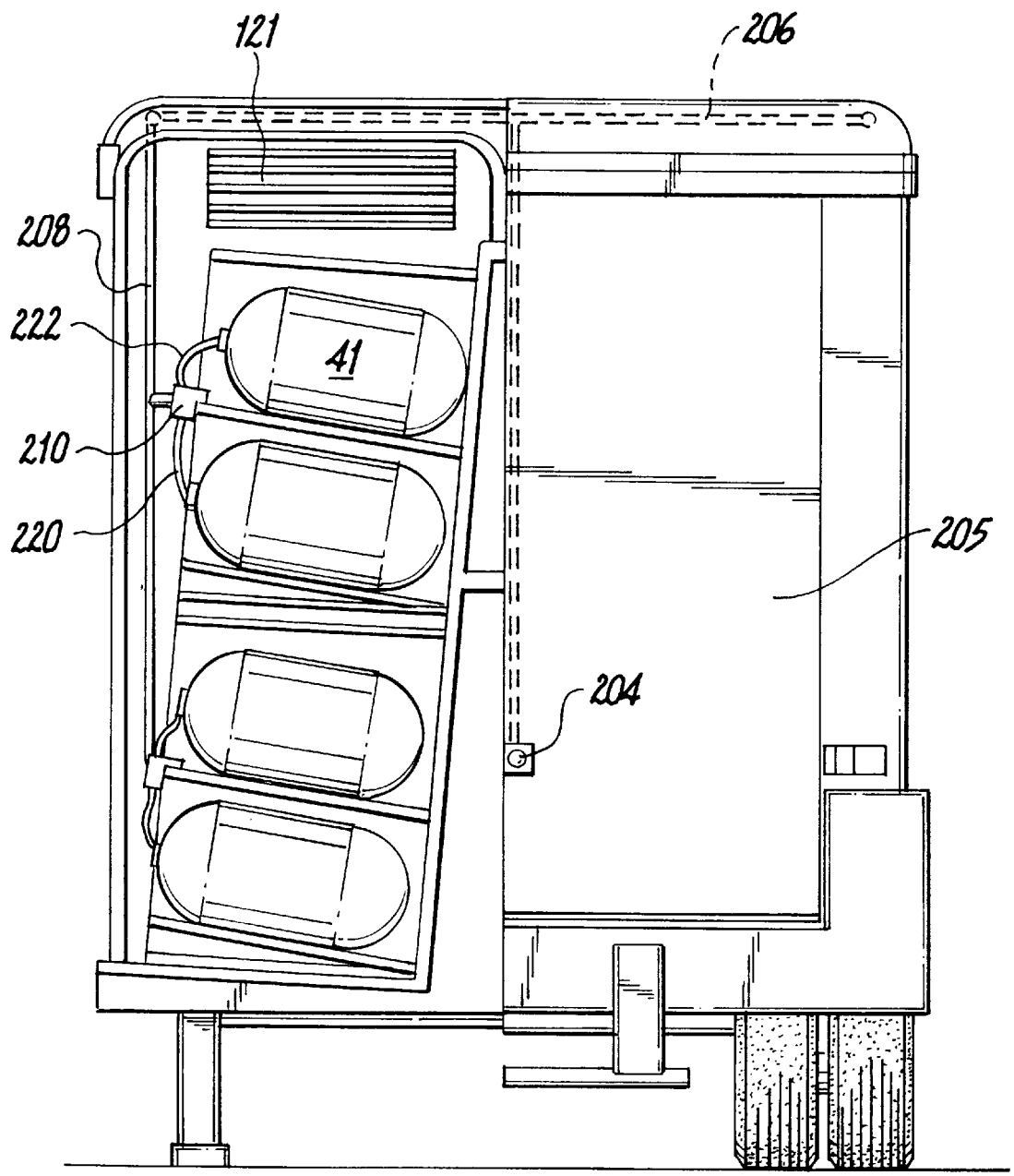
FIG. 18 is a sectional view taken along lines 18—18 of FIG. 17.
Figure 19:
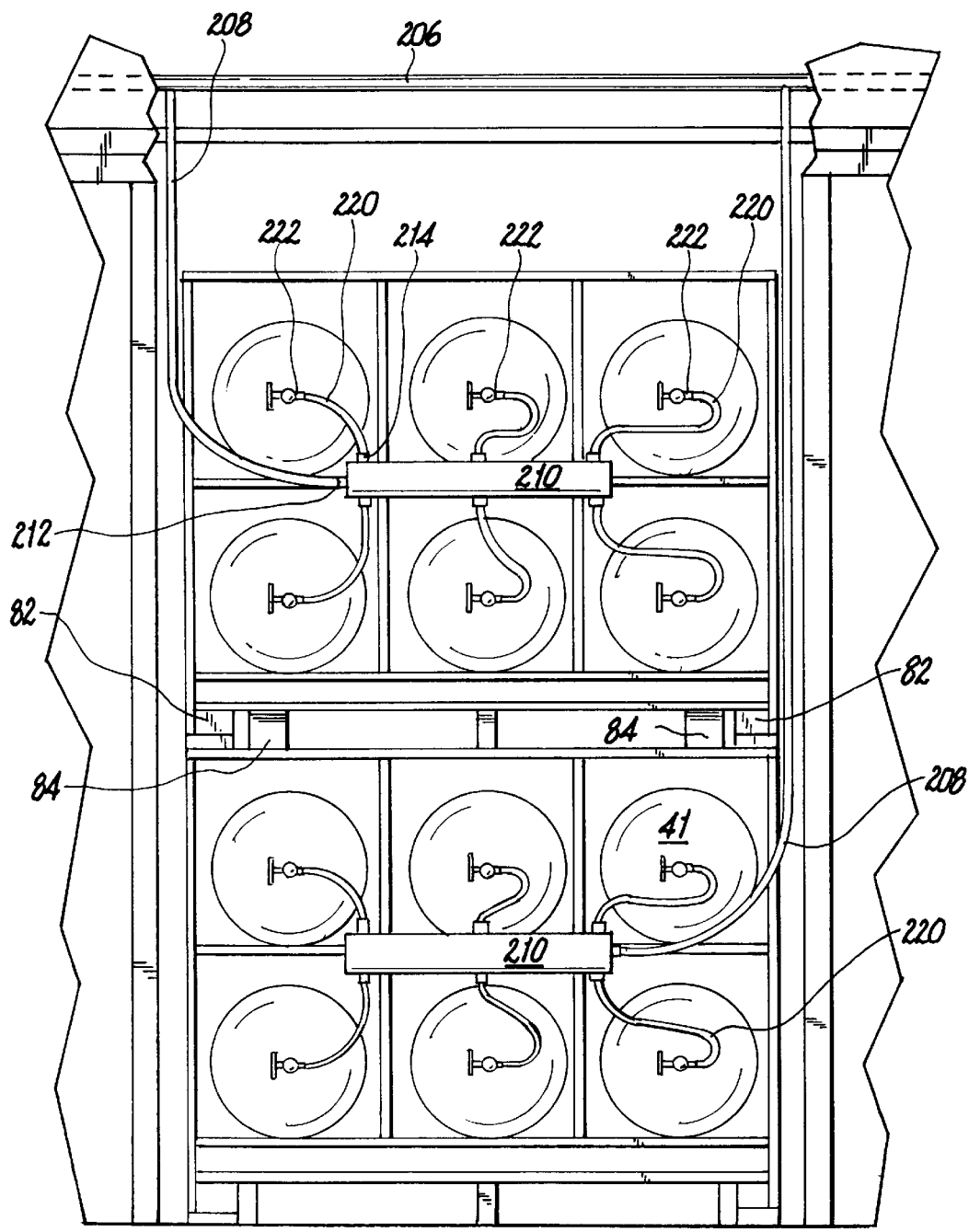
FIG. 19 is an enlarged view of one of the compartments of the refueling truck.
Figure 20:
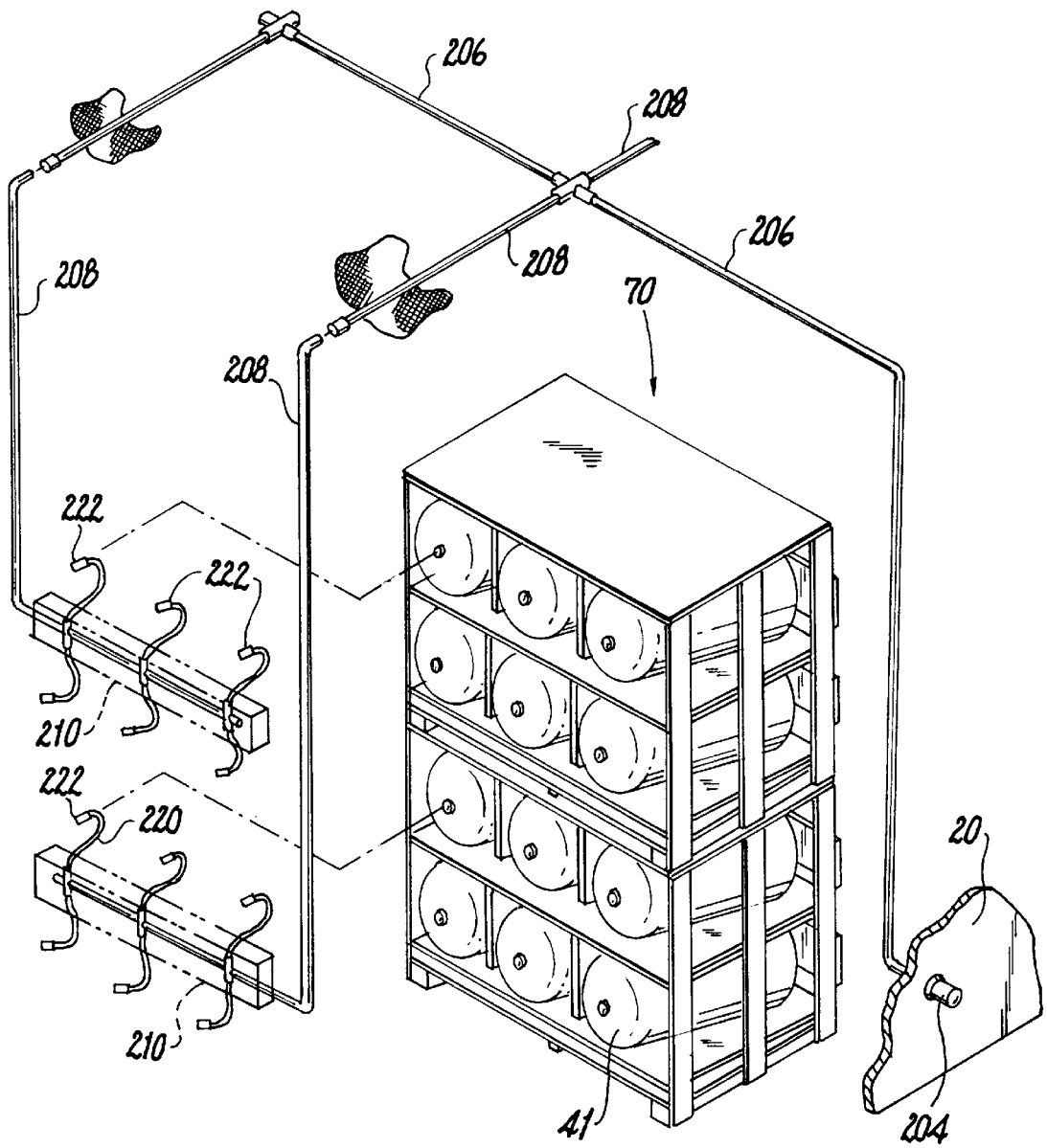
FIG. 20 is a schematic of the fuel refilling piping system.

A high pressure fuel connector 204 is mounted on the rear panel 205 of the truck and is fluidly connected to an overhead stainless steel piping system which includes a main conduit 206 that extends along the longitudinal length of the truck along the center divider 224. Bridging or lateral conduits 208 fluidly connect the piping system 206 with each individually removable delivery crate refueling manifold 210 (FIGS. 18 and 19). The delivery crate refueling manifold 210 has an inlet port 212 which can be fluidly connected to conduit 208 and has a number of outlet ports 214 which correspond to the number of cylinders 41 disposed in each crate. The manifold 210 is provided with quick release couplings to allow the easy connection and disconnection between the overhead bridging conduits 208 and the cylinders 41. The quick release couplings must be designed for repetitive use because the manifold 210 must be removable to allow for a clear path for the loading and the unloading of the delivery crates from the refueling truck.

The main conduit 206 and the bridging conduits 208 are each preferably shielded to prevent accidental damage to these conduits during the loading and unloading cycles of the delivery crates. In addition, the high pressure fuel connector 204, which is mounted on the rear truck panel, is preferably enclosed in a housing to protect the connector from damage due to, for example, inclement weather, accumulation of road dirt and debris, or other accidental damage due to contact with outside objects.

To refill the empty cylinders 41, the refueling truck is driven to a central refueling facility. The portable manifolds 210 are fluidly connected to the conduits 208 by the quick release mechanism, and a connection is made between each empty cylinder 41 and the manifold 210 by a flexible cable 220 with a quick disconnect fastener 222 at the end by attachment of the cylinder. The fuel connector 204 can then be fluidly connected to the central fueling facility. Once all of the connections to the empty fuel cylinders have been made, the flow of natural gas from the central facility through the fuel connector 204, the overhead stainless steel piping system 206, the bridging conduits 208, the manifolds 210 and to all of the empty individual cylinders 41 can begin. In this manner, all of the empty cylinders 41 within the refueling truck 200 can be filled simultaneously without requiring removal of either the delivery crates or the individual cylinders from the refueling truck. Thus, the amount of time required for refilling the empty cylinders is significantly decreased by utilizing the refueling truck according to the present invention.

The refueling trailer 200 and the delivery truck 110 are each loaded with various shaped crates 70 such that the individual cylinders 41 are inclined at an angle of 12° with respect to a horizontal reference plane. In other words, the front end of the cylinders 41 is inclined with respect to the rear end of the cylinder. Thus, each cylinder 41 is securely fastened within the vertical components of the refueling truck and the delivery truck to ensure safe delivery of the cylinders to the customer sites. In addition, the inclined truck design enables a forklift operator to approach the truck bed such that the delivery crate 70 is disposed at a 6° downward slope from the open front end to the back closed end. Thus, when the crate is loaded into the truck the front end of the delivery crate is elevated to ensure safe and proper seating of the cylinders within the crate.

Figure 21:
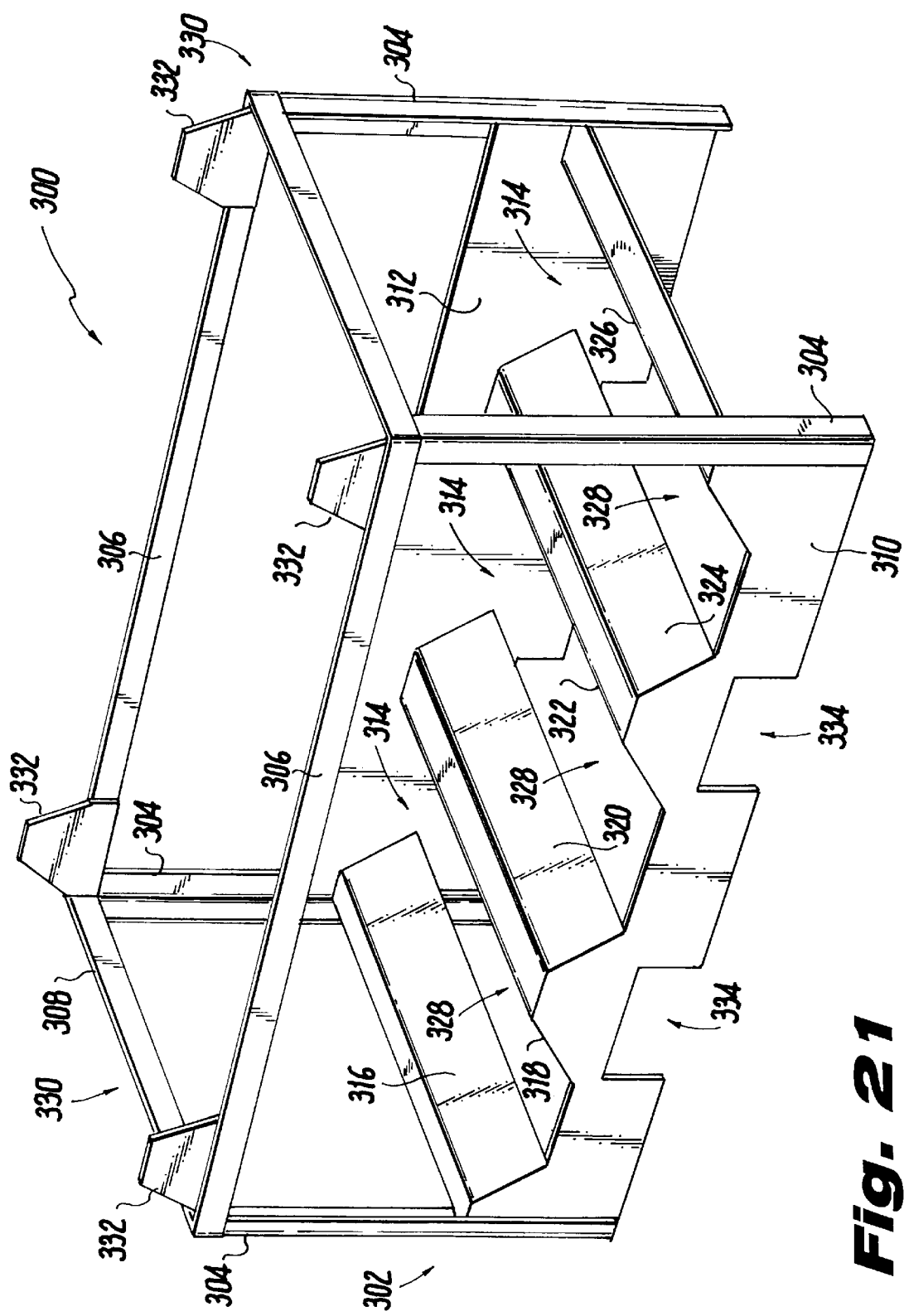
FIG. 21 is a perspective view of a crate according to the present invention.

Referring now to FIG. 21, there is shown an alternate embodiment of the crate 300 that includes a frame structure 302, comprising a plurality of vertically extending posts 304 and horizontal cross-members 306 and 308. The cross-members define a top end of the frame. The crate further includes a front end including a front wall 310 and open front area, and a back wall 312, as well as a plurality of open ended gas cylinder receptacles, generally designated 314. Each receptacle is defined by a pair of opposing, downwardly and inwardly angling walls 316 and 318, 320 and 322, and 324 and 326. The receptacles preferably slope downwardly from the front end to the back end of the crate. Each receptacle preferably defines an opening 328 at the bottom end thereof that allows a portion of a gas cylinder to extend downwardly through those openings. While the crate 300 is shown having three receptacles, it will be apparent to those of ordinary skill in the art that the crate may be formed with more or less receptacles as desired.

The crate 300, as with the crate 70 shown in FIG. 9A, includes a stacking structure 330, which preferably comprises a plurality of upstanding projections or posts 332, each of which is located adjacent to but spaced inwardly from a corner of the frame 302 and is attached to one of the respective cross-members 306. With a pair of crates 300 stacked one on top of the other, the projections of the bottom crate are received in the bottom end of the top crate to securely stack the crates and prevent shifting of the top crate relative to the bottom crate.

The crate 300 further includes a pair of downwardly opening channels 334 extending from the front wall 310 to the back wall 312 and sized for receipt of the tines of a forklift to facilitate lifting and moving the crate.

Having described the presently preferred exemplary embodiment of a new and improved natural gas distribution system, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

We claim:

1. A truck for use in a natural gas distribution system to simultaneously deliver natural gas from a natural gas source to a plurality of gas cylinders via a plurality of manifolds configured for engaging the gas cylinders, the truck having a body comprising:

a plurality of storage bays, each bay being configured for receiving at least one gas cylinder crate containing one or more gas cylinders;

a piping system attached to the truck and including an inlet for connection with the natural gas source and a plurality of conduits connected to the inlet, each conduit including an outlet located adjacent one of the respective storage bays for connection with the respective manifolds for delivering natural gas to the respective manifolds;

a front wall that includes an air inlet vent;

a rear wall that includes an air outlet vent; and a space providing air flow between said air inlet vent and said air outlet vent.

2. The truck of claim 1 wherein the inlet comprises a high pressure fuel connector.

3. The truck of claim 1 wherein the piping system comprises a main conduit connected to the inlet and a plurality of bridging conduits connected to the main conduit and configured for connection with the respective manifolds.

4. The truck according to claim 1, further comprising a motor driven fan connected to at least one of said air inlet vent and said air outlet vent for promoting air flow therebetween.

5. The truck according to claim 4, wherein said motor is an electric motor.

6. The truck according to claim 5, wherein said electric motor is brushless.

7. The truck according to claim 4, wherein said motor driven fan is connected to said air outlet vent.

8. The truck according to claim 4, further including an air flow sensor mounted to the body for sensing the air flow and wherein said motor driven fan is actuated by said air flow sensor so as to cause said motor driven fan to turn on when the air flow is below a predetermined minimum air flow to maintain at least said minimum air flow through said truck body from said air inlet to said air outlet.

9. The truck according to claim 1, wherein said space in said truck body is an open space disposed above and in fluid communication with said storage bays.

10. The truck according to claim 9, wherein said open space is disposed between said air inlet and said air outlet.

11. The truck according to claim 9, wherein the main conduit is internally disposed within the body in the open space disposed above said storage bays.

* * * * *